US012645669B2

(12) United States Patent
Fan et al.

(10) Patent No.:  US 12,645,669 B2
(45) Date of Patent:       Jun. 2, 2026

(54) CHAT-BASED QUERYING OF MULTIPLE DATA SOURCES USING A MULTI-AGENT INFRASTRUCTURE

(71) Applicant: Zoom Video Communications, Inc., San Jose, CA (US)

(72) Inventors: Xin Fan, Los Gatos, CA (US); Ailian Gan, Mountain View, CA (US); Pengcheng He, Seattle, WA (US); Madison Kay Holbrook, Ridgefield, WA (US); Juhua Ma, Los Gatos, CA (US); Mahesh Ram, Palo Alto, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/786,123

(22) Filed: Jul. 26, 2024

(65) Prior Publication Data

US 2025/0298791 A1       Sep. 25, 2025

Related U.S. Application Data

(60) Provisional application No. 63/568,868, filed on Mar. 22, 2024.

(51) Int. Cl.
*G06F 16/00*          (2019.01)
*G06F 16/242*        (2019.01)
*G06F 16/2453*      (2019.01)
(52) U.S. Cl.
CPC ........ *G06F 16/242* (2019.01); *G06F 16/2453* (2019.01)

(58) Field of Classification Search
CPC ................................................. G06F 16/2453
See application file for complete search history.

(56) References Cited

U.S. PATENT DOCUMENTS

2023/0351123 A1     11/2023   Chollampatt Muhammed Ashraf et al.
2024/0378208 A1*   11/2024   Zhou ................. G06F 16/24561
2025/0061290 A1*   2/2025     Gardner ............... G06F 16/345

OTHER PUBLICATIONS

International Search Report and Written Opinion for PCT/US2025/019686 mailed Jun. 10, 2025.

(Continued)

*Primary Examiner* — Ajith Jacob
(74) *Attorney, Agent, or Firm* — Kilpatrick Townsend & Stockton, LLP

(57) ABSTRACT

Systems and methods for implementing chat-based querying of multiple data sources using a multi-agent infrastructure are provided. In an example method, a computing system receives, from a client device, a query. The computing system determines, using an orchestrator agent, one or more relevant contexts based on the query. The computing system receives, from a storage system, context information based on the one or more relevant contexts. The computing system generates a modified query based on the query and the context information. The computing system outputs, to the orchestrator agent, the modified query and the context information. The computing system receives, from the orchestrator agent, a response to the modified query. The computing system outputs the response to the client device.

20 Claims, 17 Drawing Sheets

(56)                 References Cited

OTHER PUBLICATIONS

Microsoft Events et al. "Getting your enterprise ready for Microsoft 365 Copilot | BRK257HG", https://www.youtube.com/watch?v=We9U68QF294 the following times: 32:52, 33:28, 34:17, 35:29, 36:05, 37:07, 32: 12, 37:16, 22:17, 35:29, Nov. 16, 2023.
Balasubramanian, R. "Getting your enterprise ready for Microsoft 365 Copilot | BRK257HG", https://www.youtube.com/watch?v=We9U68QF294, Nov. 16, 2023.

* cited by examiner

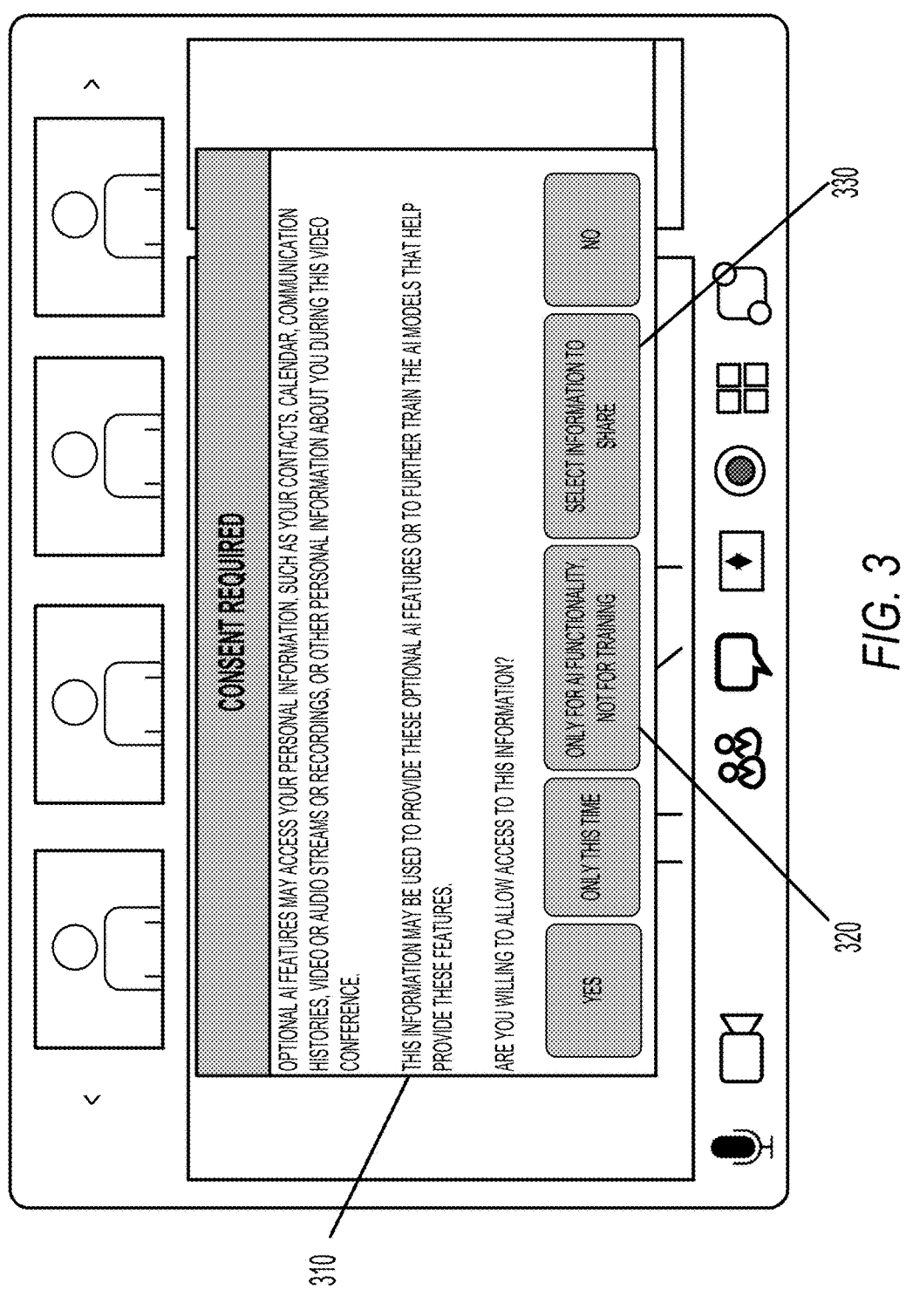

CONSENT REQUIRED

OPTIONAL AI FEATURES MAY ACCESS YOUR PERSONAL INFORMATION, SUCH AS YOUR CONTACTS, CALENDAR, COMMUNICATION HISTORIES, VIDEO OR AUDIO STREAMS OR RECORDINGS, OR OTHER PERSONAL INFORMATION ABOUT YOU DURING THIS VIDEO CONFERENCE.

THIS INFORMATION MAY BE USED TO PROVIDE THESE OPTIONAL AI FEATURES OR TO FURTHER TRAIN THE AI MODELS THAT HELP PROVIDE THESE FEATURES.

ARE YOU WILLING TO ALLOW ACCESS TO THIS INFORMATION?

YES    ONLY THIS TIME    ONLY FOR AI FUNCTIONALITY NOT FOR TRAINING    SELECT INFORMATION TO SHARE    NO

*FIG. 3*

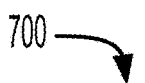

700

RECEIVING, FROM A CLIENT DEVICE, A QUERY
710

DETERMINE, USING AN ORCHESTRATOR AGENT, ONE OR MORE RELEVANT CONTEXTS
BASED ON THE QUERY
720

RECEIVE, FROM A STORAGE SYSTEM, CONTEXT INFORMATION BASED ON THE ONE OR
MORE RELEVANT CONTEXTS
730

GENERATE A MODIFIED QUERY BASED ON THE QUERY AND THE CONTEXT INFORMATION
740

OUTPUT, TO THE ORCHESTRATOR AGENT, THE MODIFIED QUERY AND THE CONTEXT
INFORMATION;
750

RECEIVE, FROM THE ORCHESTRATOR AGENT, A RESPONSE TO THE MODIFIED QUERY
760

OUTPUT THE RESPONSE TO THE CLIENT DEVICE
770

*FIG. 7*

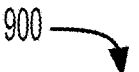

900

RECEIVE, FROM A CLIENT DEVICE, AN AUDIO STREAM OF A VIDEO CONFERENCE, INCLUDING ONE OR MORE VOICES
910

ENQUEUE THE AUDIO STREAM FOR TRANSCRIPTION
920

IDENTIFY ONE OR MORE LANGUAGES SPOKEN IN THE AUDIO STREAM
930

GENERATE A TRANSCRIPT OF THE AUDIO STREAM USING AN AUTOMATIC SPEECH RECOGNITION SERVICE
940

GENERATE A SUMMARY OF THE TRANSCRIPT USING A LARGE LANGUAGE MODEL
950

STORE THE TRANSCRIPT, THE SUMMARY, AND INFORMATION ABOUT THE VIDEO CONFERENCE IN A STORAGE SYSTEM, THE STORAGE SYSTEM INCLUDING A GRAPH DATABASE
960

*FIG. 9*

QUERY
RESPONSE
SUBSYSTEM
420

STORAGE SYSTEM
425

GRAPH STORE
610

ENTITY
DATABASE
640

ENTITY VECTOR
INDEX
650

ENTITY
DATABASE
640

DATA STORES
630

CONNECTOR
620

UTILITIES
680

EXTERNAL DATA
STORES
670

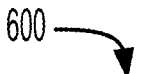
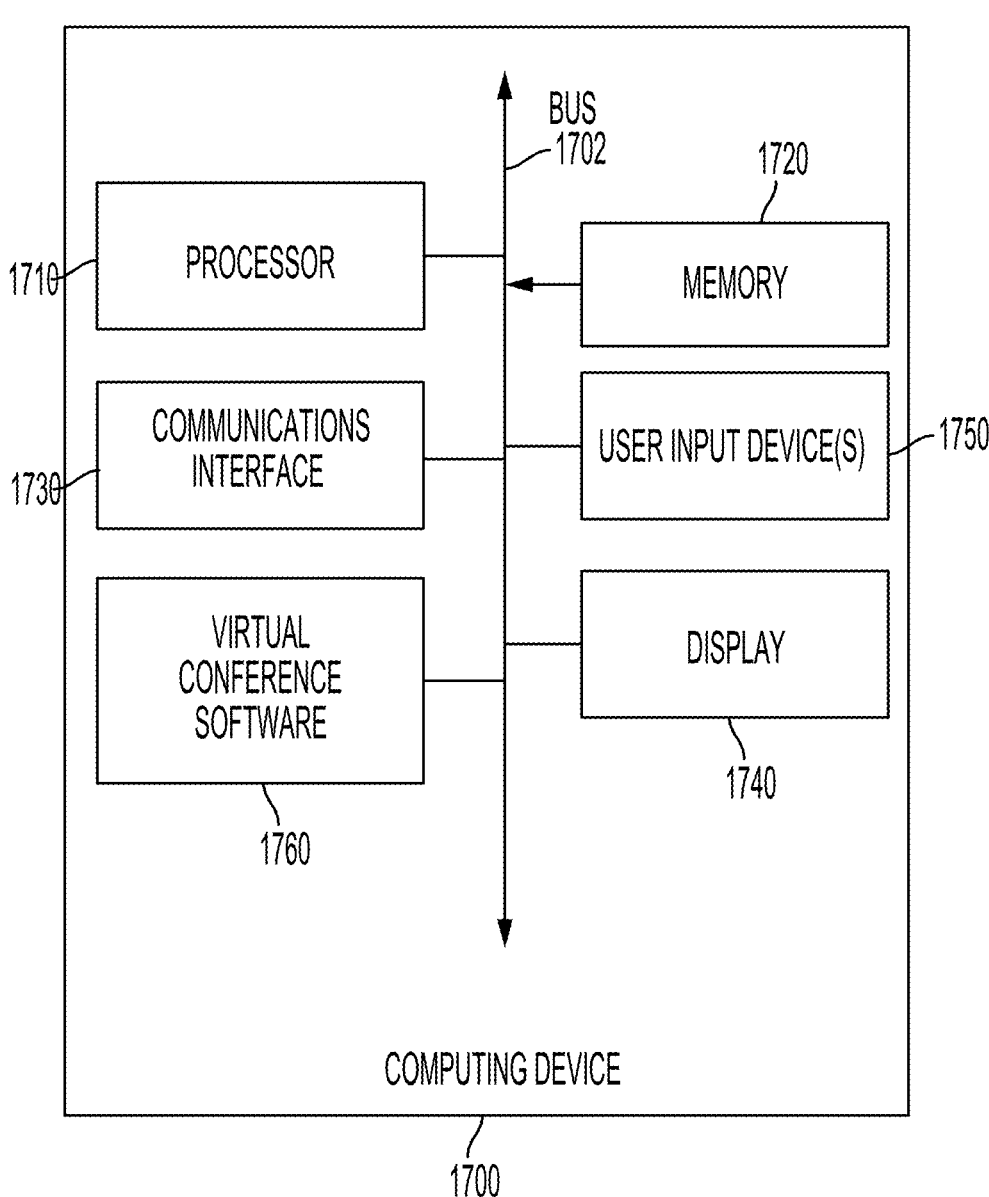
FIG. 17

CHAT-BASED QUERYING OF MULTIPLE DATA SOURCES USING A MULTI-AGENT INFRASTRUCTURE

CROSS-REFERENCE TO RELATED APPLICATION

This application claims priority to provisional application U.S. Ser. No. 63/568,868 entitled "Chat-Based Querying of Custom Knowledge Bases Using a Language Model" and filed on Mar. 22, 2024, the entire disclosure of which is incorporated herein by reference for any purpose.

FIELD

The present application generally relates to query interfaces for application support, and more particularly relates to systems and methods for enabling chat-based querying of multiple data sources using a multi-agent infrastructure.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 3 shows an example user interface that may be used in some example systems configured for chat-based querying of multiple data sources using a multi-agent infrastructure, according to some aspects of the present disclosure.

FIG. 7 shows a flowchart of an example method implementing chat-based querying of multiple data sources using a multi-agent infrastructure, according to some examples of the present disclosure.

FIG. 9 shows a flowchart of an example method for transcription during chat-based querying of multiple data sources using a multi-agent infrastructure, according to some examples of the present disclosure.

FIG. 17 shows an example computing device suitable for use in example systems or methods for providing chat-based querying of multiple data sources using a multi-agent infrastructure, according to some examples of the present disclosure.

DETAILED DESCRIPTION

Figure 1:
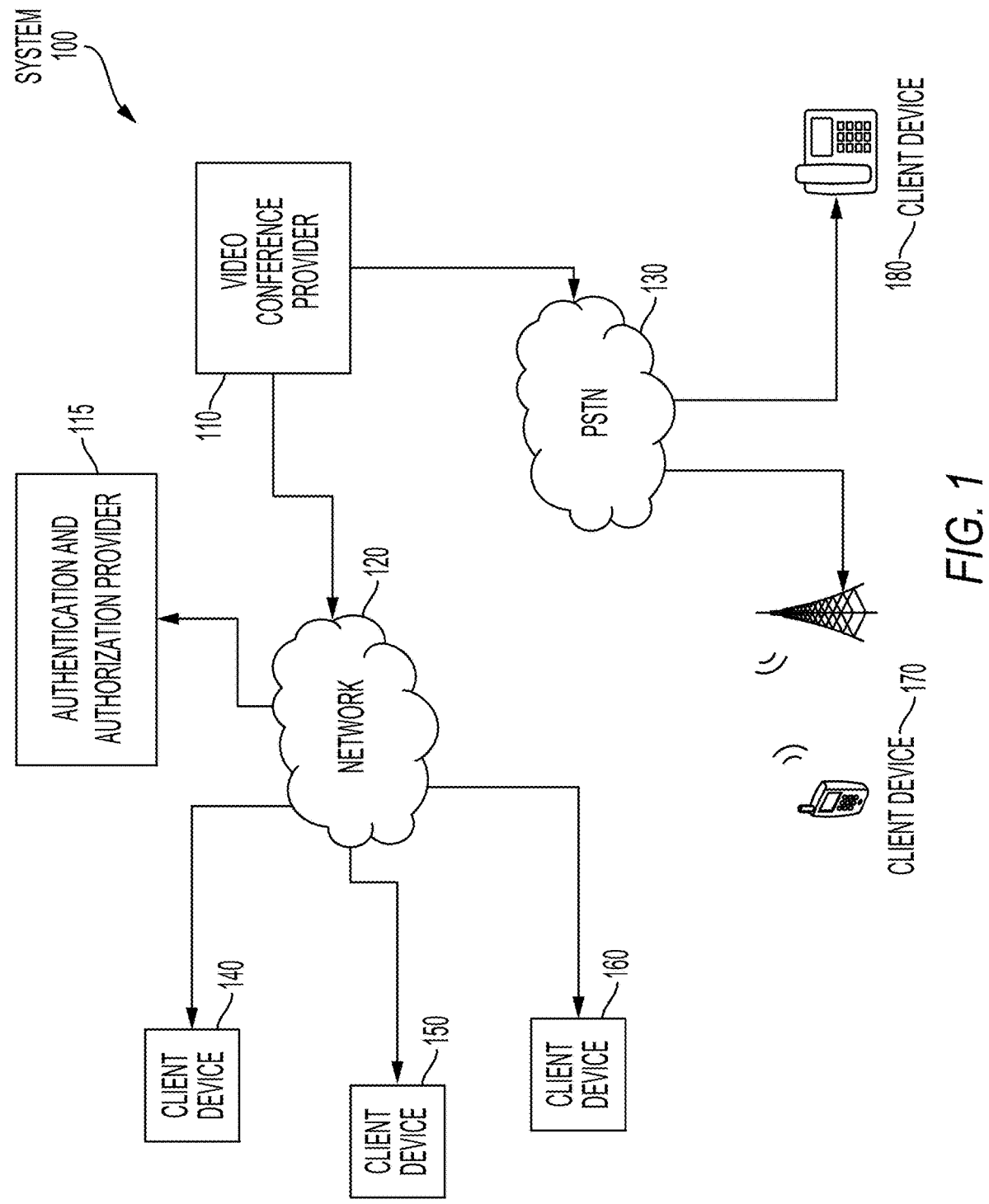
FIG. 1 shows an example system that provides videoconferencing functionality to various client devices, according to some aspects of the present disclosure.

Examples are described herein in the context of chat-based querying of custom knowledge bases using a language model. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Modern video conference providers serve as digital communication hubs. For example, a video conference provider may provide, in addition to video conferencing services, chat or text messaging, email, calendaring and scheduling services, whiteboarding, file sharing, telephony, and so on. Moreover, a video conference provider may be extendable using first- or third-party applications, further expanding the scope and diversity of the communicative capabilities of such platforms.

Consequently, video conference provider users increasingly use video conference client software to take advantage of this range of services. However, the cognitive overhead and technological knowledge burden of using video conference client software with multiple integrated services present significant challenges when using existing approaches. This is because the existing approaches still treat the multiple integrated services as independent silos and fail to capitalize on the synergies that are possible when so many different channels for digital communications are present on a single client device.

As a result, users must manually move data and information between the various provided services. For example, a discussion about a project in a chat channel must be copied and summarized by hand before being copy/pasted into a meeting agenda for an upcoming, planned video conference. Such manual processes, in addition to soaking up time and resources, are error-prone. Additionally, manual processes may be non-interactive, requiring instead technical know-whow and imperative inputs to accomplish cascades of mundane tasks and resulting in a poor user experience.

These challenges are addressed by the systems and methods for chat-based querying of multiple data sources using a multi-agent infrastructure disclosed herein. An illustrative method begins with a user of a client device executing video conference client software inputting a query into a chat-based interface integrated with an application such as a video conferencing or chat application. An example of query may be a request for a summary of a document that comes up during the course of a video conference.

The query is received by a computing system, such as a video conference provider that includes a multi-agent infrastructure including an orchestrator agent, one or more large language models ("LLMs"), and a number of specialized agents and services. The orchestrator agent plans and coordinates a series of actions that will be carried out to generate a response to the query.

First, the orchestrator agent "grounds" the query by determining one or more relevant contexts based on the query by providing it to an LLM along with a suitable prompt. For example, for the example query requesting a summary of a document, the relevant context may include the document itself, the author(s) of the document, the date and time the document was created or modified, the subject matter of the document, and so on. The computing system then receives, from a storage system, context information based on these determined contexts. For instance, the context information in this example may include the document itself, profile information about the author(s), similar documents, related media (e.g., video conference recordings or transcripts), or pertinent calendar information.

The computing system then generates a modified query based on the query and the context information. For example, the modified query may be rephrased to improve and standardize results as well as be amended to include context such as previous conversation history and the retrieved context information. The modified query, now grounded in the appropriate context, and is output to the orchestrator agent to generate a response.

The orchestrator agent can be configured to determine one or more instructions to be executed by one or more of the agents and services in the multi-agent infrastructure to generate information needed to assemble the response. For example, one portion of the task may be a document retrieval task that requires a database query, and another portion may be a summarization task that requires an agent, such as LLM fine-tuned for summarization tasks. The orchestrator agent can delegate, output, or execute the various task portions using the specialized agents or services available in the multi-agent infrastructure. The agents or services can send outputs to the orchestrator agent which can then assemble the response. The computing system receives the response from the orchestrator agent and outputs the response to the client device. The response may be viewed, for example, in the chat-based interface, creating a user experience that is subjectively similar to conversing with another human. In this respect, the query/response interaction described above is sometimes referred to as chatting with an artificial intelligence ("AI") companion.

In addition to the challenges described above, the systems and methods according to the present disclosure improve the technical field of digital communications and, in particular, query interfaces used during video conferencing and other communication applications. These technical fields are improved by enabling data integration among multiple applications and data sources using a multi-agent infrastructure that was not previously possible without significant manual effort, even if an LLM was available. Moreover, the computing systems used in some examples are improved by reduced consumption of computational resources, like processor cycles and memory, through significantly less duplicative effort. Multi-stage tasks previously completed by human collaborators over a series of iterations can now be accomplished with the click of a mouse.

These illustrative examples are given to introduce the reader to the general subject matter discussed herein and the disclosure is not limited to these examples. The following sections describe various additional non-limiting examples of chat-based querying of custom knowledge bases using a language model.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
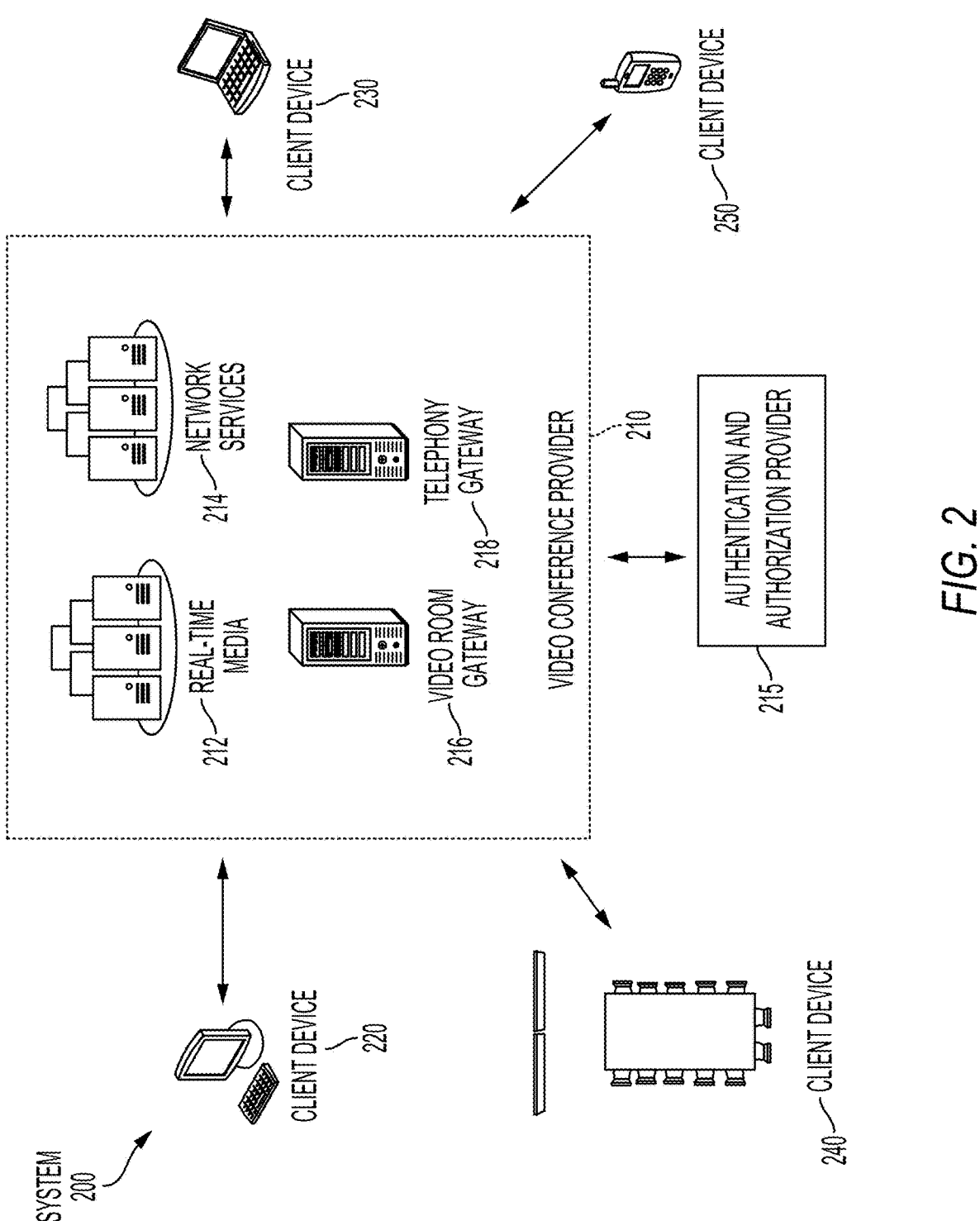
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers

214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Turning next to FIG. 3, FIG. 3 shows an example user interface 300 that may be used in some example systems configured for chat-based querying of custom knowledge bases using a language model. In some examples according to the present disclosure, a user may select an option to use one or more optional AI features available from the virtual conference provider 302. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Zoom's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 3, a user has engaged in a video conference and has selected an option to use an available optional AI feature. In response, the GUI has displayed a consent authorization window 310 for the user to interact with. The consent authorization window 310 informs the user that their request may involve the optional AI feature accessing multiple different types of information, which may be personal to the user. The user can then decide whether to grant permission or not to the optional AI feature generally, or only in a limited capacity. For example, the user may select an option 320 to only allow the AI functionality to use the personal information to provide the AI functionality, but not for training of the underlying AI models. In addition, the user is presented with the option 330 to select which types of information may be shared and for what purpose, such as to provide the AI functionality or to allow use for training underlying AI models.

Figure 4:
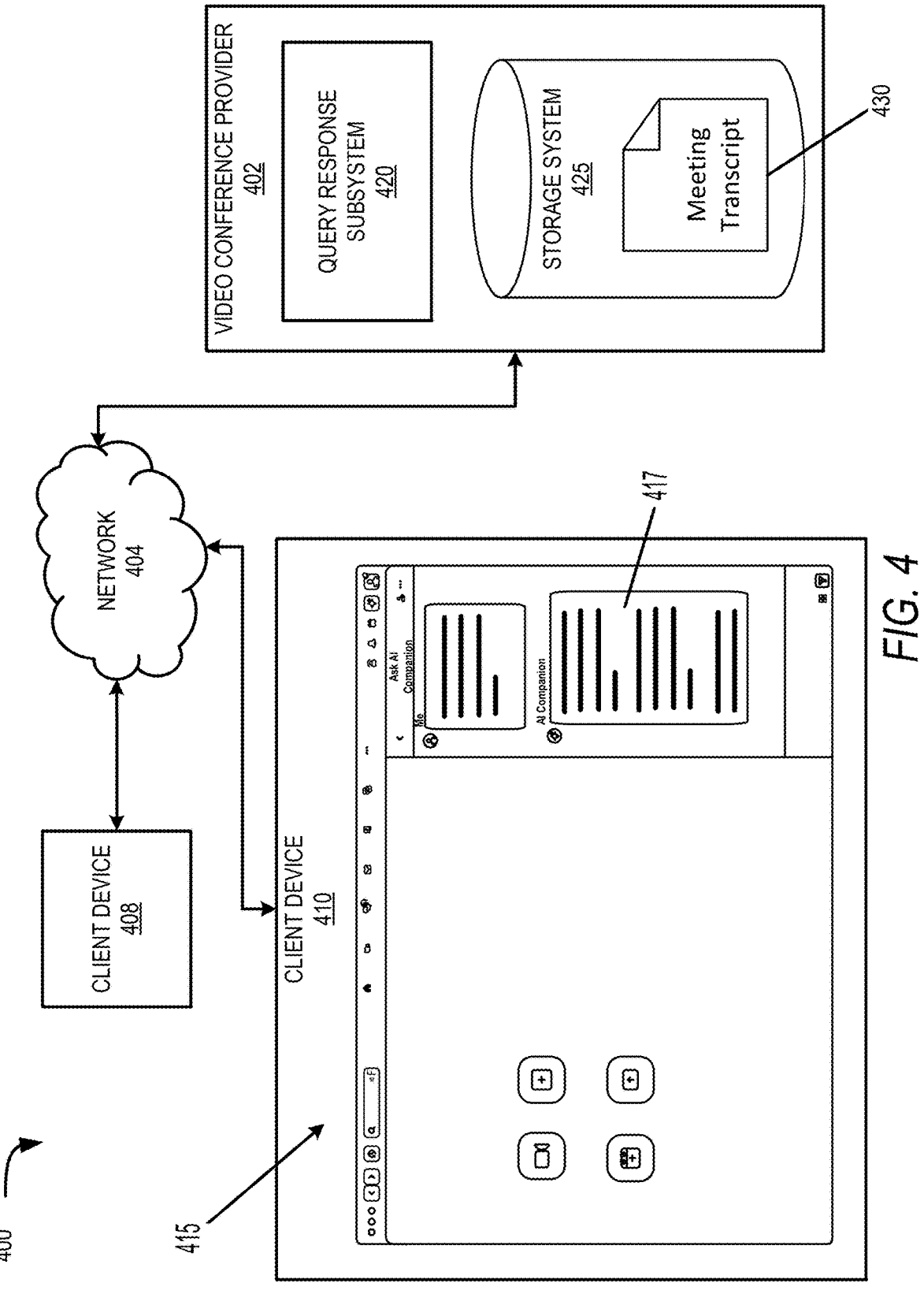
FIG. 4 shows an example of a system implementing chat-based querying of multiple data sources using a multi-agent infrastructure, according to some examples of the present disclosure.

Referring now to FIG. 4, FIG. 4 shows an example of a system 400 implementing chat-based querying of multiple data sources using a multi-agent infrastructure, according to some examples of the present disclosure. System 400 includes two client devices 408, 410 communicatively coupled with video conference provider 402 over a network 404. Network 404 may include the Internet, public networks, private networks, or combinations thereof. Video conference provider 402 is typically a server or collection of servers, including a combination of privately or cloud-hosted devices. Video conference provider 402 may be similar, in some respects, to the video conference providers 110, 210 described above with respect to FIGS. 1 and 2.

Client devices 408, 410 may be any type of device capable of executing the appropriate client software for task inference using an AI interface. For example, the client devices 408, 410 may be laptops, desktops, smartphones, tablets, internet protocol (IP) phones, and so on. The client devices 408, 410 may be executing, for example, video conference client software for using the various services provided by the video conference provider 402.

In system 400, an exploded view of client device 410 is shown with an example graphical user interface ("GUI") 415 for a video conference client software. This exemplifies one context in which chat-based querying of multiple data sources using a multi-agent infrastructure may be used, but alternative GUIs on client devices 408, 410 can be used with various examples of chat-based querying of multiple data sources using a multi-agent infrastructure. For instance, chat-based querying of multiple data sources using a multi-agent infrastructure can be used in conjunction with applications for chatting, messaging, video conferencing, telephony, calendaring, whiteboarding, email, and so on.

The example GUI 415 depicts an example home or startup UI as may be shown following starting a video conference client software, including various options relating to video conferences, calendars, chat channels, etc. The GUI 415 also includes a chat interface 417. The chat interface 417 can be used inputting and sending a query to the video conference provider 402. As suggested by the presence of the chat interface 417 on the home screen of the video conference client software, the query may relate to the subject matter of any of the various services provided by the video conference provider 402. For instance, the chat interface 417 may be used to request preparatory notes for an upcoming video conference shown calendar based on the content of a chat conversation or transcript of a previous video conference.

In parallel with the coordination of the communication services among the various participants, the video conference provider 402 can receive and provide a query entered using the chat interface 417 to a query response subsystem 420. In some examples, the query response subsystem 420 may include a multi-agent infrastructure including a number of agents and/or services. The query response subsystem 420, along with one or more language models, such as an LLM, can be configured to, among other things, determine and execute collections of queries and actions to perform the tasks implicitly or explicitly included in the received query.

The queries and actions may involve information persisted in the storage system 425. The storage system 425 may include numerous data sources, including relational databases, document stores, key-value mappings, graph databases, third-party APIs, and so on. For example, the storage system 425 may include graph databases including information about the participants in a given communication, their organizations, hardware, related communications, documents, and so on. A graph database can be particularly useful in this context, since the graph-based nature of the persisted data naturally connects related information and can thus be obtained with fewer and less complex database queries.

In this example, the storage system 425 is shown with a persisted meeting transcript 430. In the example of the request for preparatory notes described above, the multi-agent infrastructure of the query response subsystem 420 may query the storage system 425 to obtain the meeting transcript 430. The meeting transcript 430 can then be used by the query response subsystem 420 to develop the preparatory notes based at least on the meeting transcript 430. For instance, the query response subsystem 420 may use an LLM to generate a summary of a previous video conference using the meeting transcript 430 and then to create preparatory notes based on the summary.

Figure 5:
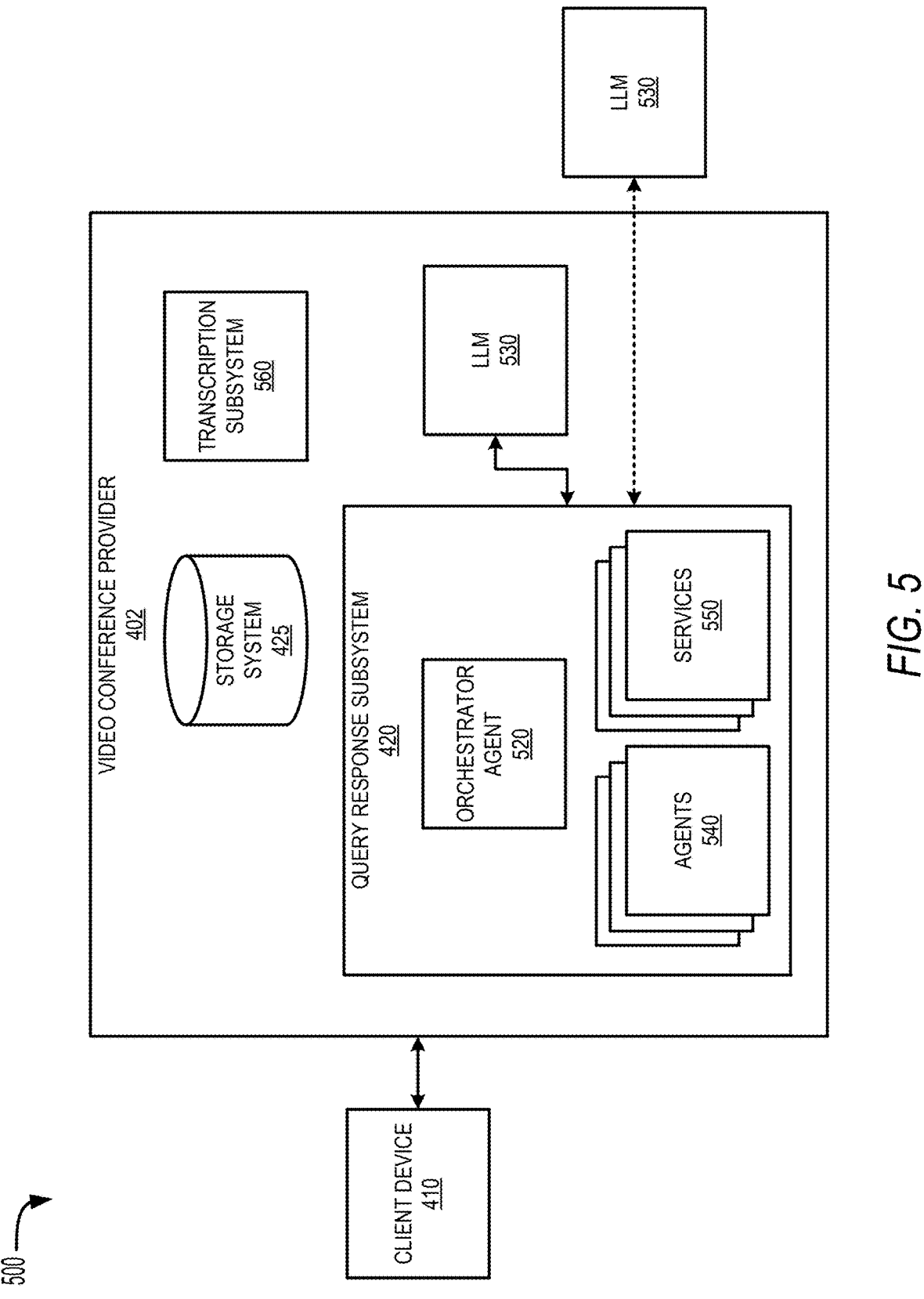
FIG. 5 shows an example of another system implementing chat-based querying of multiple data sources using a multi-agent infrastructure, according to some examples of the present disclosure.

Referring now to FIG. 5, FIG. 5 shows an example of another system 500 implementing chat-based querying of multiple data sources using a multi-agent infrastructure, according to some examples of the present disclosure. System 500 includes a client device 410 executing video conference client software, sometimes referred to as a "PT client." In this respect, the client device 410 may include functionality for using various services provided by a video conference provider 402, such as a video conferencing or meeting function, calendaring, email, whiteboarding, notetaking, chatting, and so on. The client device 410 may also execute third-party applications or integrations. The client device 410 may include a video conference application, which can be used to conduct video conferences or meetings among client devices. The various functions of the client device 410 may be accessed by way of a UI control such as a contextual tab. Several examples of UIs that can be provided by the client device 410 are shown below in FIGS. 10-15. The client device 410 can be communicatively coupled with the video conference provider 402 using a suitable API. For example, the web component may provide a web-based API that can be accessed using a protocol such as HTTPS.

During a video conference, or while using other functionality provided by the video conference provider 402 by the client device 410, a query may be output to the query response subsystem 420. The query response subsystem 420, shown in FIG. 5 as a component of the video conference provider 402, may be a component of the video conference provider 402 or a standalone component. For example, the query response subsystem 420, or a subset of the components therein, may be accessed by the video conference provider 402 using a web-based REST API or the like.

In some examples, the query response subsystem 420 for chat-based querying using a multi-agent infrastructure can be referred to as an AI companion ("AIC"). The AIC may be provided as a UI element resembling a chat or messaging application. Several examples of such UIs are shown in FIGS. 10-15. In some examples, use of the AIC may be precluded until a notice, consent form, disclaimer, terms or service, or other legal document is read and digitally signed, such as discussed above with respect to FIG. 3. In some examples, the content of such documents may be obtained from an API or website known to include the most recent version of such legal documents.

The query response subsystem 420 can be configured to respond to arbitrary, natural language queries as well as predetermined queries, relating to, for example, preparing for a meeting, brainstorming, writing, summarizing, and so on. Such queries can be output by the client device 410 using a web-based API to the query response subsystem 420. The query response subsystem 420 may include components such as a web server or web application than can receive and process incoming messages (e.g., HTTP messages) that include queries. The query response subsystem 420 may further include components such as a gateway or relay component that can, for example, add received queries to a queue or topic for consumption by the multi-agent infrastructure described below using an asynchronous messaging framework.

The query response subsystem 420 includes components constituting a multi-agent infrastructure, including an orchestrator agent 520, a number of agents 540, and a number of services 550. The multi-agent infrastructure can be used to generate responses to arbitrary tasks or queries as received from, for example, a chat-based interface from the client device 410. Some example tasks can include summarization, transcription, translation, sentiment analysis, content analysis, scheduling, or filtering. The flexibility of the multi-agent infrastructure can enable the performance of a broad range of tasks and the generation of responses to a broad range of inquiries.

In some examples, the multi-agent infrastructure can be configured using several LLMs or other AI/ML models operating in concert within a shared computational environment or communicatively coupled. This can facilitate the exchange of natural messages or other machine-readable data structures between and among the orchestrator agent 520 and agents 540, which can enable a modular approach to generation of the query response.

The multi-agent infrastructure of the query response subsystem 420 may include a collection of specialized components including an orchestrator agent 520 that can receive incoming requests and coordinate the various elements of the system to enable generation of a query response or task inference and execution. The multi-agent infrastructure of the query response subsystem 420 includes orchestrator agent 520. The orchestrator agent 520 may be configured with information about the components and capabilities of the specialized components of the query response subsystem 420 in order to determine, based on received queries, instructions to be executed by a combination of agents 540 and/or services 550. The determined instructions can be output to the respective agent or service and a response received following completion of the instruction. The orchestrator agent can generate, based on the instruction output, a portion of the response then generate a response to the query based on the received response portions.

In some examples, the orchestrator agent 520 may be associated with a number of APIs for using particular types of queries or queries containing particular content. For example, the orchestrator agent 520 may expose APIs for summarization queries, queries involving name tagging (e.g., "@Alice" or "@Bob"), speaker tagging (e.g., identifying and labeling the contributions of different speakers in a conversation or text for spoken or audio queries), or APIs that may specify particular ML models in use by certain agents 540 or services 550. In some examples, the exposed APIs have associated software development kits (SDKs) for use during development of the agents 540 and services 550.

In some examples, the orchestrator agent 520 includes or uses an LLM 530. The LLM 530 can act as the primary engine for natural language understanding and generation for the orchestrator agent 520 and the agents 540. For example, the LLM 530 can include one or an ensemble of LLMs that are used (e.g., queried via a suitable API) by the orchestrator agent 520 or the agents 540. In some examples, the orchestrator agent 520 or the agents 540 may include an LLM 530 as a component. Through role-based prompting or using a partitioning strategy, one LLM 530 can act in multiple roles. For instance, one LLM 530 can provide natural language services for the orchestrator agent 520 and/or the agents 540. In another example, multiple LLMs may be used to provide the LLM 530 for the orchestrator agent 520 and/or the agents 540.

Upon receiving a query, the LLM 530 can parse or interpret the query to determine the relevant contexts associated with the query, the specific tasks required, and identify which agents 540 or services 550 are best suited to perform each task based on their capabilities or roles. The orchestrator agent 520 can then delegate these subparts of the query to the agents 540 or services 550 by outputting commands to execute their respective tasks. The direction may involve natural language direction in the case of LLM-based agents 540 or services 550 or commands or program codes for services involving APIs, command line interfaces, database connectors, etc. Delegation may take place directly using suitable web-based APIs or using an asynchronous messaging paradigm.

The LLM 530 may be a self-hosted LLM that is a component of the query response subsystem 420 or a third-party LLM accessible using a web-based API or other suitable method for remote access, or combination thereof. A self-hosted LLM can refer to an LLM that is pre-trained and deployed on a computing environment operated by the video conference provider 402 such as server hardware, virtual machines, or a cloud computing environment. Examples of popular self-hosted LLMs include Meta's Llama 2 and 3, Mistral (https://mistral.ai/), Falcon (https://falconllm.tii.ae/), the MPT models of the MosaicML Foundation series, and BLOOM (https://bigscience.huggingface.co/), among many others. Self-hosted LLMs may be hosted on private servers or private cloud infrastructure for specialized tasks. Alternatively, LLMs or models hosted by cloud providers such as Amazon Web Services (AWS), Microsoft Azure, or Google Cloud may be used. Examples of third-party LLMs include the OpenAI GPT series, the Claude models by Anthropic, Google's Gemini series, among many others. These examples are provided for context and are not intended to be limiting in any way.

In some examples, retrieval augmented generation (RAG) can be used to augment the LLM 530 with context-specific, organization-specific, task-specific knowledge. RAG may include accessing relevant documents from a suitable data source in the storage system 425 and conditioning the LLM 530 response generation on the retrieved context. This can enable the LLM to respond to queries in the context of the retrieved knowledge, beyond its training data, enabling it to produce more informed and tailored outputs.

The multi-agent infrastructure of the query response subsystem 420 includes agents 540. Each of the specialized agents 540 can be configured to handle specific aspects of supported tasks. For example, one agent may be specialized for document and text processing operations while another may be specialized to perform mathematical or programming operations. Agents 540 may be specialized using techniques such as few-shot learning, prompt engineering, or fine-tuning on domain-specific datasets.

In some examples, one or more of the agents 540 may be implemented as an LLM 530 or using an LLM 530. For example, LLM 530 can act as multiple agents 540, by, for example, using prompts that specifies a particular role when responding. When the orchestrator agent 520 and one or more agents 540 are implemented as LLMs, they can interact between and among each other using a conversational interface. For example, the orchestrator agent 520 and one or more agents 540 can exchange natural language questions and answers to each other using a suitable API provided by the LLM 530.

In addition to agents 540 based on LLMs, the agents 540 may include rule-based agents, statistical models, retrieval-based agents, and so on. For instance, a retrieval-based agent could rely on a vector database search system to convert incoming requests into an embedded vector representation using a pre-trained embedding model. The query vector can be used to perform a similarity search in the vector database to determine an appropriate response.

In some examples, the agents 540 may be defined or labeled as "skills." In this paradigm, each agent includes a collection of components for performing a certain action or set of actions. The collection of components may include an LLM 530 as well as other components such as rule-based algorithms, natural language processing ("NLP") tools, ML classifiers, code generation tools, database management systems, and so on. Examples of skills include generating "next steps" following a communication session such as a video conference, preparing for a video conference or other communication session, or summarizing a document or other data.

The multi-agent infrastructure of the query response subsystem 420 includes services 550. Services 550 may include components for supporting a range of expected functionalities that can facilitate the task execution instructions generated by the agents 540. Example of services 550 may include data access, data processing, task scheduling, load balancing, API management, formatting, logging and monitoring, caching and optimization, and so on. Services 550 can be implemented using a modular approach such as microservice architecture in which some services 550 are accessible by the agents 540 using a suitable API. Suitable APIs may include web-based APIs, custom binary APIs, remote procedure calls (RPCs), and so on. In some examples, the services 550 may include one or more executors. Executors can include narrowly scoped services such as command lines or database clients configured to perform specific instructions or steps.

For instance, one example service 550 may be a database access service that can receive queries and retrieve matching information from the storage system 425. In this example, the database access service may be a database client that can be operated using commands determined by an agent 540. Alternatively, the database access service can be implemented using an LLM 530 that "wraps" the database access components. For example, the database access service can receive a natural language instruction to query the storage system 425, generate a suitable query, and access the storage system 425 using an underlying client component or another service.

The services 550 may include clients for accessing a widely scoped knowledge base, including information stored in storage system 425 as well as other data sources. The storage system 425 or other data sources, made available through clients or APIs for services 550, may be queried as directed by the agents 540 for information related to evaluating incoming tasks and completing the operations determined for tasks. The knowledge base, including information stored in storage system 425 as well as other data sources accessible by services 550, may include data sources such as bug- or issue-trackers, documentation, source control metadata, email archives, social media data, meeting transcripts, chat information, emails, notes, whiteboards, documents, presentations, reports, wikis, knowledge bases, FAQs, troubleshooting guides, product documentation, legal contracts, code repositories, APIs, API documentation, databases, spreadsheets, customer feedback, support tickets, training materials, research papers, patents, news articles, social media posts, blogs, forums, websites, and so on. For instance, some services 550 may include APIs and clients for accessing products or data of third-party providers such as Atlassian's Jira, Google products (e.g., Google documents), Microsoft products (e.g., Office documents), or Atlassian's Confluence.

In an example exchange among the components of the multi-agent infrastructure of the query response subsystem 420, the orchestrator agent 520 may receive, from the client device 410, a chat message requesting a summarization of a document. Following generation of a modified query to improve the query and add relevant context information, the orchestrator agent 520, can determine, using LLM 530, one or more executable instructions to perform the summarization. For instance, the orchestrator agent 520 can be prompted to review the received chat message, determine if it seems to include, implicitly or explicitly, any tasks. If so, the orchestrator agent 520 can be further prompted to develop a list of executable instructions necessary for the performance of the task in light of the available agents 540 and services 550. In this example, the executable instructions may include downloading the document from a database using a database retrieval service and then generating a summary of the document using a suitable agent or skill that is fine-tuned for summarization tasks.

In some examples, certain operations to be performed by the agents 540 or services 550 according to the determined executable instructions may require explicit permissions or consent of one or more users. In these cases, the orchestrator agent 520 can, using agents 540, generate information about the task to be output to the client device. For example, the inferred task and determined instructions can be distilled to a short question asking for permission and/or confirmation to perform the task. The orchestrator agent 520 can then receive, from the client device, an indication to execute the task, such as a chat message affirmatively requesting or authorizing performance of the task.

Continuing the example exchange, the orchestrator agent 520 can then output commands to cause the execution of the executable instructions constituting the task. For example, the orchestrator agent 520 can output commands to the agents 540 or the services 550 to perform various aspects of the task. The executable instructions can be performed sequentially or in parallel according to the determination of dependencies among the steps by the orchestrator agent 520. The various agents 540 or the services 550 receiving commands can then output responses back to the invoking agent. For instance, the database retrieval service may return the document and an indication of successful retrieval (e.g., a success status code). Each such returned response can be a portion of the overall query response.

Following execution of the executable instructions, the orchestrator agent 520 can generate or direct an agent to generate, a query response using the response portions returned during execution of the determined instructions. For instance, if the query involves a document summarization task, the query response may be a succinct, formatted summary of the document. The generated output may be formatted with, e.g., readability annotations, download links, URLs, and so forth.

The system 500 includes transcription subsystem 560 that can be used to generate transcripts from audio streams from recordings of video conferences, telephone calls, voice memos, or other audio sources. The transcript can be used as input to certain agents 540 or services 550 for completion of some parts of the executable instructions determined for the query. However, because transcription may take a considerable amount of time and prevent near-real-time interactivity, transcription may be performed asynchronously and automatically. For example, partial transcripts may be generated during video conferences in near-real-time while full transcripts may be generated following the completion of a video conference as transcription resources become available.

Figure 6:
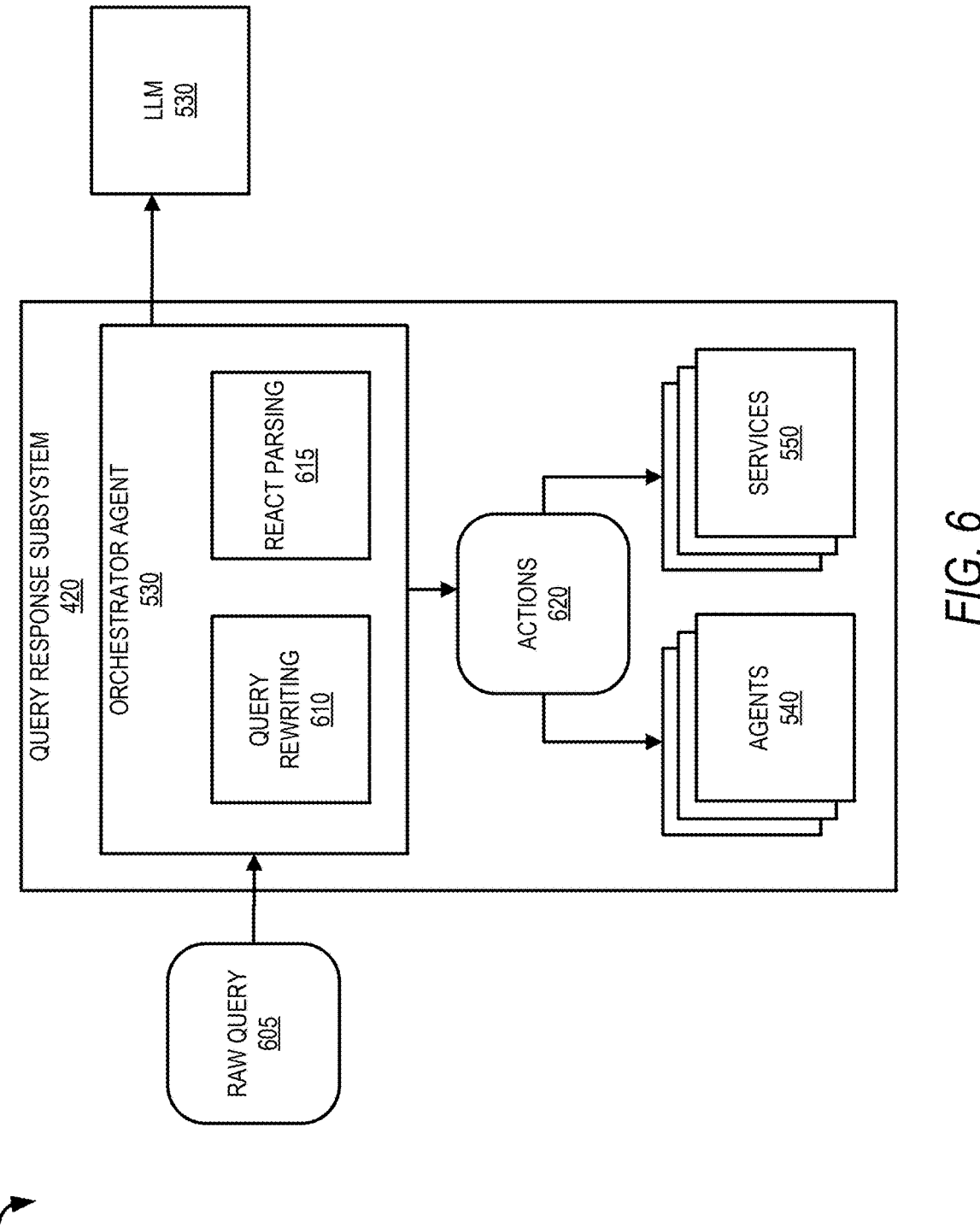
FIG. 6 shows yet another example of another system implementing chat-based querying of multiple data sources using a multi-agent infrastructure, according to some examples of the present disclosure.

Referring now to FIG. 6, FIG. 6 shows yet another example of another system 600 implementing chat-based querying of multiple data sources using a multi-agent infrastructure, according to some examples of the present disclosure. System 600 shows, in particular, components for generating a modified query based on the query and context information obtained from storage system, 425. These components may be referred to collectively, in some examples, as a "SmartPrompt gateway."

In this example, components of the orchestrator agent 520 of the query response subsystem 420 generate the modified query, but other implementations are possible. For instance, the query rewriting component 610 or ReAct parsing component 620 may be standalone components of the query response subsystem 420. The orchestrator agent 520 may include components for preparing received queries for processing by other agents 540 or the LLM 530. Modifying the received queries may involve rewriting or augmenting the queries with additional information or dividing the query into reasoning and acting parts. The dividing the query into reasoning and acting parts is sometimes referred to a "ReAct" parsing. ReAct parsing may include methods for enhancing the quality and accuracy of results from LLMs using methods relating to reasoning, action planning, and integration of various knowledge sources to help LLMs utilize the most appropriate and up-to-date information in their responses.

Query rewriting component 610 may add additional context to the received query and rewrite the query in a format well-suited for processing by a ReAct parsing component 620. For example, the query rewriting component 610 can retrieve context such as conversation history and add it to the context of the query. For queries directed to an LLM, adding the conversation history to the context of the query may involve including the conversation history in the LLM prompt.

In another example, the query rewriting component 610 may rewrite, rephrase, paraphrase, or otherwise restate the query to ensure that the intent of the query is clearly communicated to the LLM 530. For example, in colloquial dialog, the formal intent of the author may not be clearly communicated in each communication. Query rewriting component 610 can rewrite the query, in these cases, to make explicit the intent of the query author. For instance, if the query asks, "what is the capital of France?" the query response subsystem 420 may response "Paris." Then, if the query asks, "how about China?" the intent of the query author may not be apparent without rewriting the query based on the conversation history. In this example, the query may be rewritten as, "what is the capital of China?"

The ReAct parsing component 620 can use LLM 530 to parse the query to break down the query into manageable parts that can be accomplished using the available agents 540 or services 550. The manageable parts may be categorized broadly as reasoning or acting parts. In some cases, reasoning parts may be well-suited for responding to using LLM 530 while the acting part may be well-suited for execution by one or more services 550. However, reasoning parts may sometimes be performed by services 550 (e.g., an ML model service) while acting parts may be performed by an LLM 530 (e.g., an LLM fine-tuned for summarization).

The determined parts can then be prioritized by the orchestrator agent 520 and output to the agents 540 or services 550 as prompts or commands.

The ReAct parsing component 620 may also include the capability to act in a feedback loop, in which the modified query is modified again in response to receiving output from an agent or service. For example, an initially modified query can be provided to LLM 530 to obtain an initial reply from the LLM 530. The initial reply can be parsed and validated. If validation passes, the conversation history can be updated to provide the context for subsequent queries. Validation criteria may be based on measurements of the query author's intent relative to the initial reply.

Referring now to FIG. 7, FIG. 7 shows a flowchart of an example method 700 implementing chat-based querying of multiple data sources using a multi-agent infrastructure, according to some examples of the present disclosure. The description of the method 700 in FIG. 7 will be made with reference to FIG. 8, however any suitable system according to this disclosure may be used, such as the example systems 100 and 200, shown in FIGS. 1 and 2. It should be appreciated that method 700 provides a particular method implementing chat-based querying of multiple data sources using a multi-agent infrastructure. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. The operations described in method 700 may be performed by different devices. For example, the description is given from the perspective of the video conference provider 402 but other configurations are possible.

At block 710, a computing system, such as a video conference provider 402, receives, from a client device 410, a query. For example, the client device 410 can execute video conference client software that provides a chat-based query interface, sometimes referred to as an AI companion ("AIC"). The AIC may be provided as a UI element resembling a chat or messaging application. Several examples of such UIs are shown below in FIGS. 10-15. In some examples, use of the AIC may be precluded until a notice, consent form, disclaimer, terms or service, or other legal document is read and digitally signed. In some examples, the content of such documents may be obtained from an API or website known to include the most recent version of such legal documents.

A user of the client device 410 can input the query into a free-form chat interface or by selecting a predetermined query such as a preparation task, a summarization task, or a scheduling task. The predetermined query may be a prompt for an LLM 530 including instructions to complete the task. The prompt associated with the predetermined query may be included as data in the UI of the chat-based interface or may be looked up by reference in the storage system 425 using a suitable service in the query response subsystem 420 upon receipt of the message (e.g., HTTP packet) including the query.

At block 720, the computing system determines, using an orchestrator agent 520, one or more relevant contexts based on the query. The operations in this block and block 730 are sometimes referred to as "grounding" the query. Grounding the query can involve ensuring that query responses are based on relevant and accurate context. For example, relevant context may include adding data or organization- or user-specific information to the query to enforce response accuracy or relevance. In this respect, grounding may refer to enhancing responses by accessing external or other data sources such as the Internet, or other services 550. Grounding can help contextualize and enrich the query response.

The one or more relevant contexts may be determined by an LLM 530. For example, the orchestrator agent 520 may prompt LLM 530 to identify subjects or implied subjects of the query that are relevant contexts for responding to the query. Examples of relevant contexts include a particular video conference, a messaging transcript, an email, certain calendar information, or information about a user. The LLM 530 may be a locally hosted, private LLM, an LLM on a remote server, or an LLM provided by a third party and accessed using a suitable API. For example, a GPT-series LLM provided by OpenAI may be used. A locally trained open-source LLM such as Meta's LLAMA can be used in lieu of or in parallel with the GPT-series LLM for some queries or tasks. In some examples, a mixture of experts (MoE) architecture may be used which includes a number of "expert networks" and a gating network that dynamically allocates input data to the experts based on their specialized capabilities. In this content, an expert network can be a component that specializes in a particular subset of the overall task or dataset, such as a neural network trained to handle specific kinds of inputs or problems. The expert network may themselves be LLMs. Each expert is trained on a subset of the data or task domain, allowing for specialization, while the gating mechanism learns to weigh the experts' contributions, combining them to produce the final output optimized for the specific task at hand. The LLM or the combination of models therein can be used alone or in combination to respond to the user prompt and to generate subtasks.

At block 730, the computing system receives, from a storage system 425, context information based on the one or more relevant contexts. For example, the orchestrator agent 520 can use the determined relevant contexts from block 720 to generate database queries to execute against the various data sources in the storage system 425 to obtain the context information. For example, a graph structure for users, groups, or organizations/tenants persisted in storage system 425 can be queried using a graph query relations service. The context information can also be provided by way of one or more services 550 that provide additional data or capabilities. For example, a plugin architecture can be used to provide additional skills. Additional skills may include data sources or modules that include program code for execution of various tasks. In this respect, the determination of the relevant contexts in block 720 refers to determining what context is needed, and the receiving of the context information in the block refers to obtaining the needed information previously determined.

For each relevant context of the one or more relevant contexts, the orchestrator agent 520 or a suitable agent or service can query a data source included in the storage system 425 and receive information about the relevant context. For example, if the relevant context is a particular document referenced in the query, then the information about the relevant context may be the document itself, a network or disk location of the document, metadata about the document, a summary of the document, and so on.

In some examples, grounding the query may use techniques such as retrieval augmented generation ("RAG") to augment the query with context-specific, organization-specific, or task-specific knowledge. RAG may involve obtaining relevant documents from a suitable data source and conditioning the LLM's response generation on the retrieved context. In other words, the relevant documents can be added to a prompt as context for responding to the prompt.

At block 740, the computing system generates a modified query based on the query and the context information as described above with respect to FIG. 6. For instance, the modified query can be rewritten according to certain business rules or be augmented with the context information obtained in block 730. In some examples, where the query is part of an ongoing going conversation, the orchestrator agent 520 can access the thread including all previous queries and previous responses for the ongoing conversation. The thread can be added to the query as context for generating the response.

At block 750, the computing system outputs, to the orchestrator agent 520, the modified query and the context information. The orchestrator agent 520 can determine which skill or service to use based on the modified query. A message can be sent using an asynchronous messaging platform to the agents 540 or services 550 to request generation of a response by a specialized, domain-specific agent or, for example, execution of an API call for the skill or service. Following a period of time for execution of the request, the actor or service can send back the execution result to the orchestrator agent 520. The orchestrator agent 520 can analyze the execution result and generate any required next steps. This process can be repeated until a final response can be provided to the user.

At block 760, the computing system receives, from the orchestrator agent, a response to the modified query. For example, the response can be relayed to the query response subsystem 420 using a suitable asynchronous messaging framework. The response may be in a format suitable for display in a chat-based interface. For example, the response may be plain text or HTML-formatted. Some chat-based interfaces include enhanced, rich-text capabilities such as "deep links" to additional information or documents. Such enhanced chat-based interfaces may provide an API for adding additional formatting to the response to take advantage of such features.

In some examples, the response may be evaluated for validity prior to being returned to the client device. For example, the computing system can determine a validity status of the response by first determining a compliance status of the response and then determining whether the purview of the response is appropriate for the client device.

The compliance status may be a measure of compliance with adherence to relevant laws, regulations, and internal policies. Compliance may refer to ensuring that LLM responses comply with relevant laws, regulations, organizational policies, data privacy laws (e.g., GDPR), content moderation policies, industry-specific regulations, and so on. The computing system can output the received response to an LLM 530 along with a suitable prompt to determine the compliance status. In some examples, a specialized agent such as a fine-tuned LLM 530 may be used to determine the compliance status.

In some examples, the purview can refer to whether the response is relevant, suitable, and within the scope of what the client device is authorized for. In another example, purview may refer to the scope or range of subjects and contexts the LLM is configured to address or perform tasks in relation to. Purview may be limited through setting boundaries on the types of queries it can respond to, the nature of information it can disclose, and ensuring the LLM does not produce outputs beyond its reliable knowledge base or training data. For example, purview settings may be used to restrict the LLM from generating medical advice, legal opinions, or financial recommendations. In another example, documents or other data obtained from the storage system 425 may be associated with certain permissions, roles, classification levels, or other security measures. The response can be processed by a specialized agent such as a fine-tuned LLM 530 to confirm that the received response does not include any information for which the client device 410 is not authorized to view.

At block 770, the computing system outputs the response to the client device. For example, the received response may be returned to the client device 410 in response to an API request or pushed over a persistent connection such as a secure WebSockets connection. The response include suitable formatting information along with media such as images, video, or audio included in the response. The client device 410 can display the response as a response in the chat-based interface, similar in appearance to a response received from another.

Figure 8:
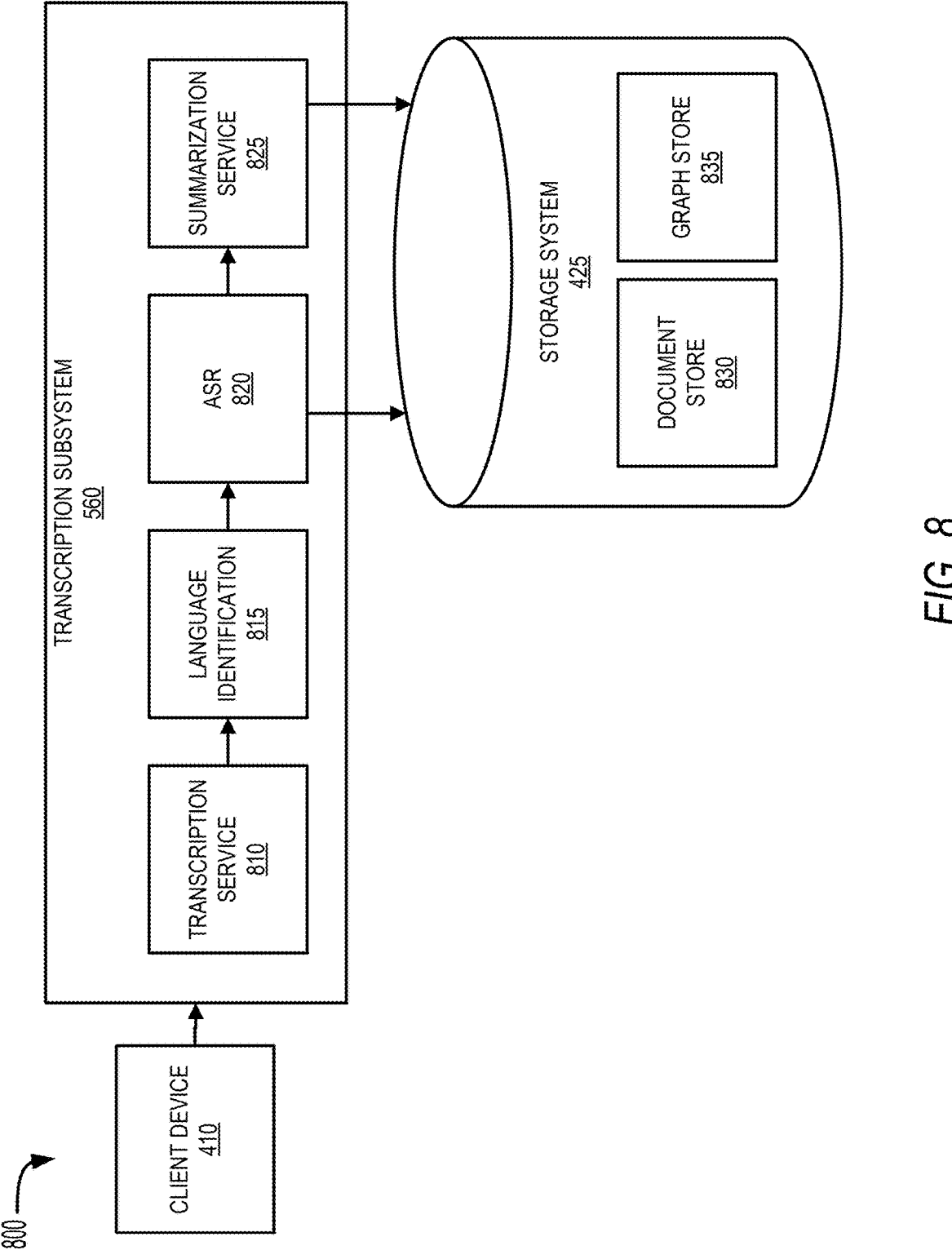
FIG. 8 shows an example implementation of a transcription subsystem 560 used for chat-based querying of multiple data sources using a multi-agent infrastructure, according to some examples of the present disclosure.

Referring now to FIG. 8, FIG. 8 shows an example implementation 800 of a transcription subsystem 560 used for chat-based querying of multiple data sources using a multi-agent infrastructure, according to some examples of the present disclosure. In particular, implementation 800 shows details of the transcription subsystem 560 shown in FIG. 5. As in FIG. 5, the transcription subsystem 560 may be a component of the video conference provider 402 or a standalone component. For example, the transcription subsystem 560 may be accessed by the video conference provider 402 using a web-based REST API or the like.

In some examples, the components of the transcription subsystem 560 described below may exchange information secured using use WebSockets over Secure Sockets Layer (SSL)/Transport Layer Security (TLS) (collectively "WSS") for inter-service communication. Other communication protocols may be similarly used for inter-service communication.

Transcription subsystem 560 includes a transcription service 810 that receives incoming transcription requests and coordinates transcription operations among the components of the transcription subsystem 560. In some examples, the transcription subsystem 560 may include a transcription gateway service that can receive information for transcription or translation from upstream multimedia routers (MMRs) such as audio streams from completed or ongoing video conferences, telephone conversations, videos, etc. MMRs can include specialized routers that prioritize and efficiently manage high-bandwidth multimedia data streams to ensure optimized quality with minimal latency. For example, the audio streams and related information received from the MMRs may include a number of standalone or multiplexed video or audio streams from an in-progress or completed video conference. The transcription service 810 may include a queueing subsystem for efficiently distributing parallel transcription tasks among a number of parallel nodes.

Transcription subsystem 560 includes a language identification component 815. The language identification component 815 may automatically detect the language used in the received video or audio streams. In the event that the language identification component 815 cannot detect the language or if there is a mismatch between the detected and transcribed language, an indication may be returned to a participating client device including a command to cause the client device to prompt the participant to specify the correct language.

Transcription subsystem 560 includes automatic speech recognition ("ASR") component 820. The ASR component 820 may include one or more machine learning ("ML") models trained to convert spoken audio to text in a particular language or languages. In a simple example, the ASR component 820 may include an encoder for generating an embedded representation of received audio and a decoder trained to convert the embedded representation to text. The ASR component 820. The ASR component 820 may be based on any suitable ML architecture, including recurrent neural networks ("RNNs"), long short-term memory ("LSTM") networks, attention mechanisms, transformers, autoencoders ("AEs"), variational AEs ("VAEs"), generative adversarial networks ("GANs"), normalization layers (e.g., batch normalization, layer normalization), or pooling layers, among many others.

Transcription subsystem 560 includes summarization service 825 for summarizing completed or partial translations. In some examples, the summarization service 825 includes or makes use of an LLM configured for or fine-tuned for summarization tasks. For example, the summarization service 825 may include an LLM fine-tuned for summarization tasks using supplemental training and adjustment of parameters based on specialized text-summary pairs. In some examples, the summarization service 825 may operate asynchronously with transcription operations and, for example, notify the meeting service upon completion of summarization operations using an asynchronous messaging service.

Completed or partial transcriptions or translations as well as summarizations may be persisted in a suitable persistent store such as a component of the storage system 425. For instance, text documents such as transcripts, summaries, or translations may be stored in a relational database or a document store 830. Information relating, for example, meeting metadata, completed or partial transcriptions, summarizations, and so on, may be persisted in graph store 835. In some examples, the text documents may be redundantly stored in both the document store 830 and the graph store 835. However, references to the documents stored in document store 830 can more efficiently and safely be stored in graph store 835.

Although the examples discussed above with respect to implementation 800 involve transcription of an audio stream, some of the components described may be used for translation of incoming audio streams. For example, the language identification component 815 and the ASR component 820 can be used to convert incoming audio streams into text. A translation service (not shown) can be used to convert the text transcript into a translated text. The translation service may used a similar queuing approach to the transcription service 810 described above to enable efficient, parallel translation operations. The transcriptions thus generated can be likewise stored in the persistent stores of the storage system 425.

Referring now to FIG. 9, FIG. 9 shows a flowchart of an example method 900 for transcription during chat-based querying of multiple data sources using a multi-agent infrastructure, according to some examples of the present disclosure. The description of the method 900 in FIG. 9 will be made with reference to FIG. 8, however any suitable system according to this disclosure may be used, such as the example systems 100 and 200, shown in FIGS. 1 and 2. It should be appreciated that method 900 provides a particular method implementing chat-based querying of multiple data sources using a multi-agent infrastructure. Other sequences of operations may also be performed according to alternative examples. For example, alternative examples of the present disclosure may perform the steps outlined above in a different order. Moreover, the individual operations illustrated by method 900 may include multiple sub-operations that may be performed in various sequences as appropriate to the individual operation. Furthermore, additional operations may be added or removed depending on the particular applications. The operations described in method 900 may be performed by different devices. For example, the description is given from the perspective of the transcription subsystem 560 of the video conference provider 402 but other configurations are possible.

At block 910, a computing system, such as a video conference provider 402, receives, from a client device 410, an audio stream of a video conference, the audio stream including one or more voices. For example, the audio stream of an in-progress video conference can be output to the transcription subsystem 560 to generate a partial transcript of the in-progress video conference. As the in-progress video conference progresses, the audio stream can be output to the transcription subsystem 560 again to cause the transcript to be updated. In some examples, the transcript can be generated upon completion of the video conference. In some examples, transcripts may only be generated upon request by a user and may require the explicit consent of all video conference participants.

At block 920, the computing system enqueues the audio stream for transcription. A queuing approach can be used to prioritize incoming transcription requests in relation to available transcription resources. For example, partial transcripts may be generated for in-progress video conferences, telephone calls, etc. to enable chat-based querying in the context of the information in those partial transcripts. Such transcription can be relegated to the highest priority queues. In contrast, transcriptions following completed video conferences may not be needed for some period of time, if ever. Thus, transcriptions of completed video conferences, etc. can be enqueued with a lower priority. In some examples, transcription services may be requested on-demand, which may also be accorded a high priority.

At block 930, the computing system identifies one or more languages spoken in the audio stream. For example, the transcription subsystem 560 may include a language identification component 815 as described in FIG. 8 above. The language identification component 815 may include an ML trained to identify one or more spoken languages based on audio samples obtained from the incoming audio stream. Identification of the spoken language may be needed to direct the audio stream to the appropriate transcription service that may include ML models trained using specific languages.

At block 940, the computing system generates a transcript of the audio stream using an automatic speech recognition service. For example, the automatic speech recognition service may include an ML model trained to generate text from spoken speech. The ML model may include an encoder for generating an embedded representation of received audio and a decoder trained to convert the embedded representation to text, but other ML model architectures are possible.

At block 950, the computing system generates a summary of the transcript using a large language model. This block may be optionally performed when frequent need for a summary is anticipated. Thus, generation of the summary may be configurable by users or organization administrators. Generation of the summary may be effected by the summarization service 825 or other service configured to generate summaries. In some examples, the LLM 530 and a suitable prompt can be used to generate the summary of the transcript output from block 940.

At block 960, the computing system stores the transcript, the summary, and information about the video conference in a storage system, the storage system including a graph database. For example, the transcript, the summary, and information about the video conference can be stored in a relational database, a document-based database, a graph database, or other suitable persistent store. In some examples, some elements may be stored in multiple locations to improve the efficiency of retrieval by eliminating the need for follow-on "join" queries for complex database queries.

Figure 10:
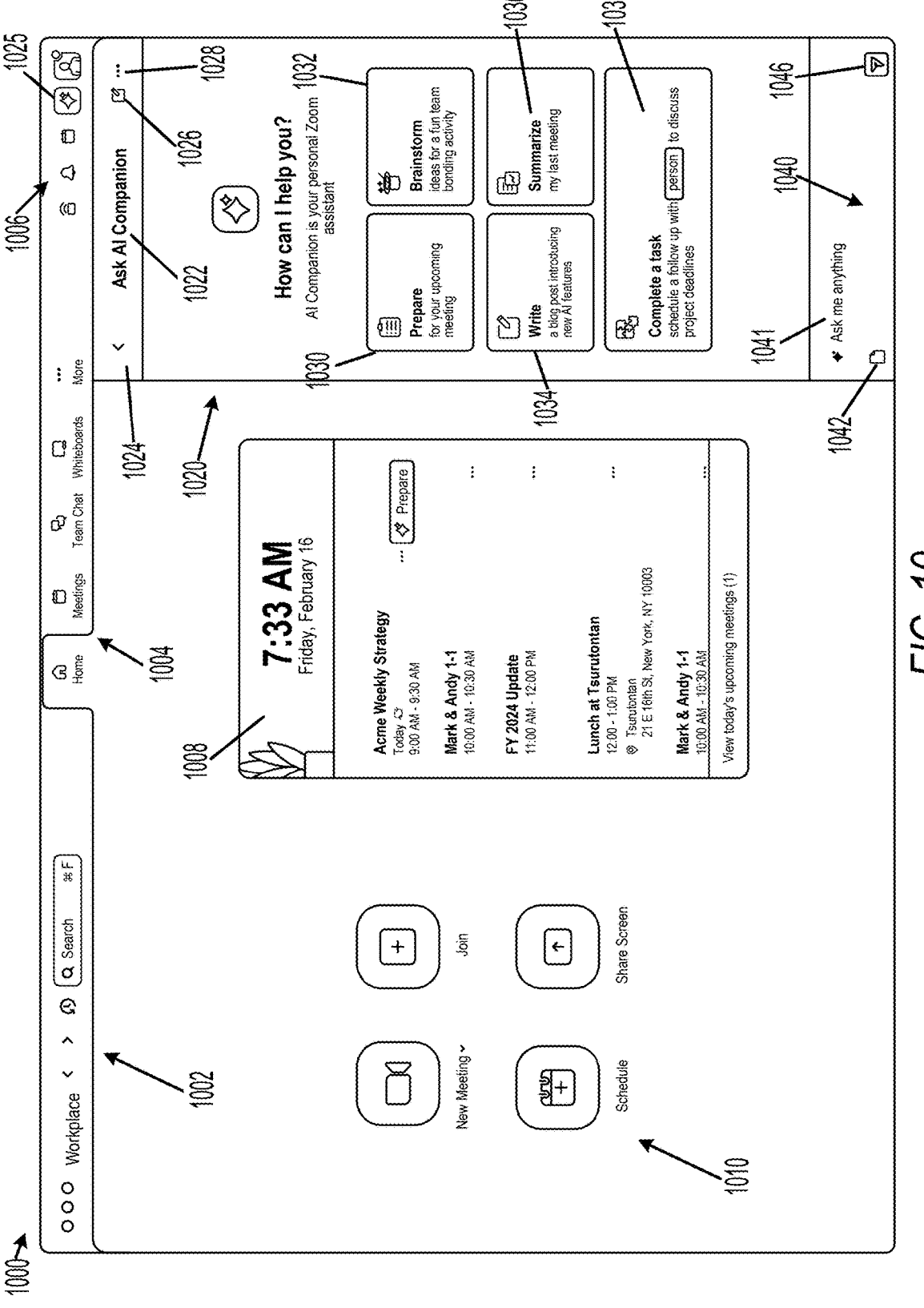
FIG. 10 shows an example of a video conferencing application UI that may be shown or interacted with on some client devices configured for chat-based querying of multiple data sources using a multi-agent infrastructure, according to some examples of the present disclosure.

FIG. 10 shows an example of a video conferencing application UI 1000 that may be shown or interacted with on some client devices configured for chat-based querying of multiple data sources using a multi-agent infrastructure, according to some examples of the present disclosure. The UI 1000 may be the UI shown upon startup or as the "home" screen of a video conference client software. The UI 1000 may be displayed on a display device of a client device 410 executing a video conference client software implementing chat-based querying of multiple data sources using a multi-agent infrastructure.

UI 1000 includes top controls 1002 for navigating the screens and interfaces of the video conference client software. The top controls 1002 may include UI controls similar to those found in a web browser such as forward, back, reload, page search, and so on. Application tabs 1004 can also be used for navigation among the client applications included in the video conference client software for using the services of the video conference provider 402. The example UI 1000 shows application tabs 1004 for the home screen (shown in FIG. 10), a calendar application, a chat application, a whiteboard application, as well as a menu for showing additional applications. Profile controls 1006 can be used to access and configure user and account settings. For instance, the profile controls 1006 may include UI controls for accessing account settings and configurations, a personal calendar, pending notifications, and so on.

The UI 1000 includes action buttons 1010 for ready access to common actions relating to applications included the video conference client software. For example, the action buttons may include buttons for starting a new video conference, joining an in-progress video conference, scheduling a video conference, or sharing the screen of the client device displaying the UI 1000 on a display device during an in-progress video conference. Video conference schedule 1008 may show planned video conferences, chat conversations, whiteboard sessions, etc. for an upcoming period of time and can be used similarly to the action buttons 1010 to perform common actions such as joining a video conference or chat channel.

The UI 1000 depicted in FIG. 10 shows a chat-based interface 1020 for inputting custom or predetermined queries. The chat-based interface 1020 is shown with label 1022 including the name "Ask AI Companion," but other labels may equally apply to the chat-based interface 1020 shown here. The chat-based interface 1020 can be activated or expanded using a chat-based interface start control 1025 and further includes a expand control 1024 that can be used to hide the chat-based interface 1020 once it has extended from the "drawer" on the right side of the screen as depicted in FIG. 10.

The new chat control 1026 can be used to start a new conversation. As described above in block 750 of FIG. 7, the thread history can be added to received queries to generate a modified query with the context of the previous conversation or thread. In some examples, multiple concurrent conversations may be possible using a tabbed interface (not shown). Starting a new conversation may be useful when, for example, the existing conversation has filled the context window of the LLM 530 in the query response subsystem 420 or has diverged from the subject matter earlier in the conversation, making the previous context less relevant. Various examples of the chat-based interface 1020 may include other controls that can be shown using the menu control 1028.

The chat-based interface 1020 includes several predetermined queries that can be indicated using controls 1030-1038. The controls 1030-1038 may cause a predetermined query to be output to the video conference provider 402, as if the query had been input to the query input window 1040 described below. For example, the predetermined query may be in the form of a prompt for an LLM 530 including instructions to perform a task.

The prepare control 1030 can be used to, for example, indicate a query to generate a response for preparing for the next scheduled meeting. The brainstorm control 1032 can be used to, for example, indicate a query to generate ideas for activities for a group of users. The write control 1034 can be used to, for example, indicate a query to generate a document based on recent user activities. The summarize control 1036 can be used to, for example, indicate a query to generate a summary of the most recent completed video conference or chat conversation. The schedule control 1038 can be used to, for example, indicate a query to generate a calendar event or task relating to recent user activities. The above description of the predetermined queries that can be indicated using controls 1030-1038 are merely examples, and many variations are possible. In some examples, the predetermined queries can be configured by the user of the client device.

The query input window 1040 includes input field 1041 and send control 1046 for entering and outputting queries to the video conference provider 402 using an input device connected to the client device 410 such as a keyboard. The query input window 1040 includes an attachment control 1042 that can be used to provide supplemental context for generating the query response to the query response subsystem 420. For example, a particular document or image can be attached to the query which can then itself be a subject of the query.

Figure 11:
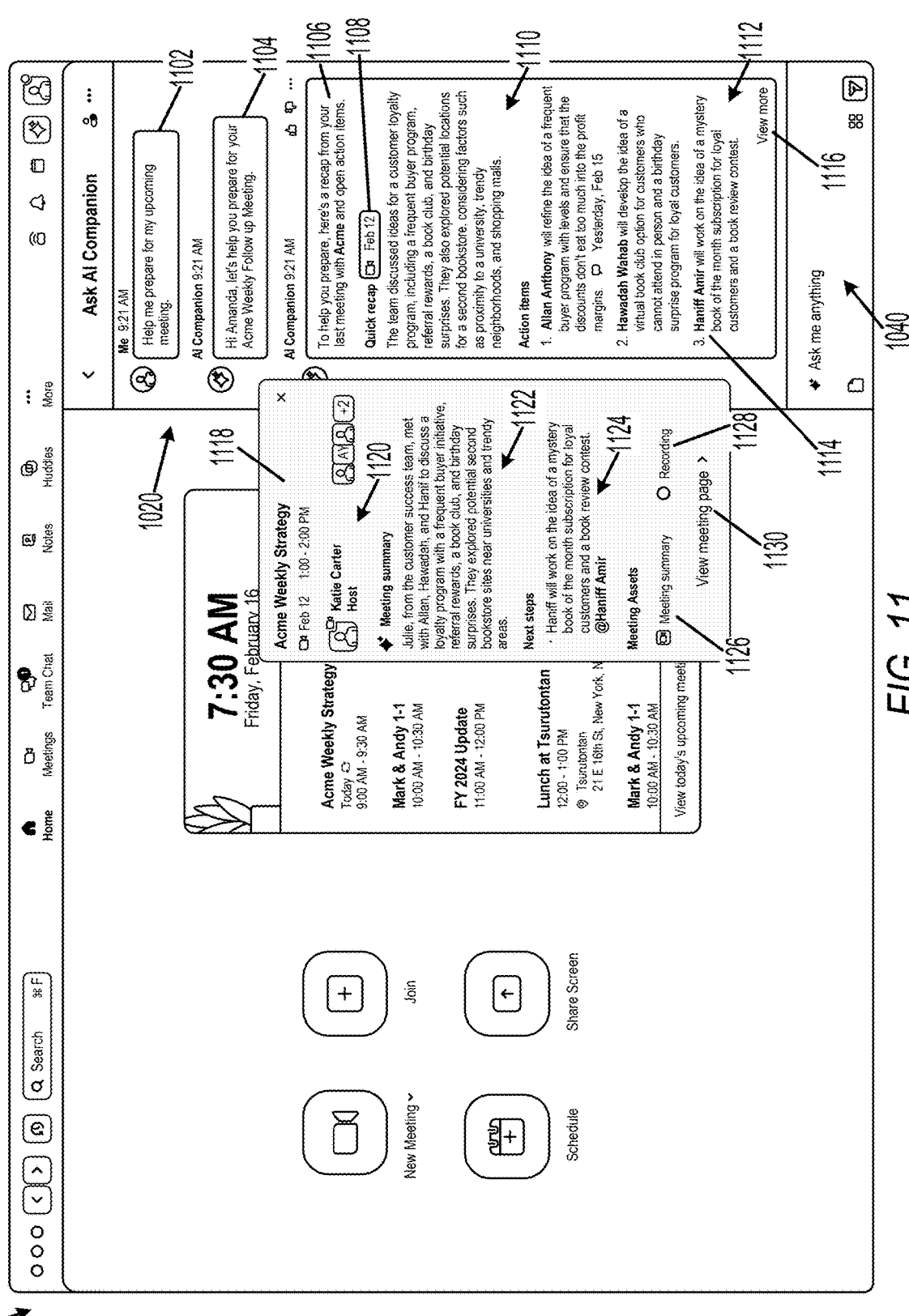
FIG. 11 shows another example of a video conferencing application UI that may be shown or interacted with on some client devices configured for chat-based querying of multiple data sources using a multi-agent infrastructure, according to some examples of the present disclosure.

FIG. 11 shows another example of a video conferencing application UI 1100 that may be shown or interacted with on some client devices configured for chat-based querying of multiple data sources using a multi-agent infrastructure, according to some examples of the present disclosure. UI 1100 is similar to UI 1000 of FIG. 10 but shows an in-progress conversation in the chat-based interface 1020. In particular, UI 1100 depicts an example chat conversation that may follow a selection of the prepare control 1030 predetermined query.

The chat-based interface 1020 shows a query 1102 generated by the UI 1100 as a result of the selection of the prepare control 1030. The query thus generated may be integrated into the UI 1100 as, for example, data included in HTML elements. In some examples, the UI 1100 may be include program code (e.g., JavaScript code) that accesses a web-based API of the video conference provider 402 to obtain the language used in the query 1102. At 1104, the query response subsystem 420 provides a provisional response while the query response 1106 is generated.

The query response 1106 includes various elements that can be used to prepare for the next upcoming video conference for the user of the client device 410. Response body 1110 includes a summarization of a previous video conference. Other information that may be summarily included includes summaries of related documents, chat conversations, images, videos, and so on. A recap control 1108 can be selected to cause recap window 1118 to be shown. The recap window 1118 shows more details about the previous video conference in more detail than is provided in the summary. For example, the recap window includes participants 1120, a video conference summary 1122, next steps 1124 identified during the previous video conference. Also provided in the recap window 1118 are links to meeting assets such as meeting summary control 1126 and a recording 1128 of the previous video conference. Meeting page control 1130 can be selected to navigate to a detailed calendar event for the previous video conference.

The response body 1110 includes a number of additional links 1114 that can be selected to obtain more information. The additional information may included in the response or may cause additional queries to the orchestrator agent 520. In this example, the additional links 1114 are included in a list of action items 1112 included as part of the meeting preparation response. A more information control 1116 can be used to provide paging for query responses that are longer than one screen height.

Figure 12:
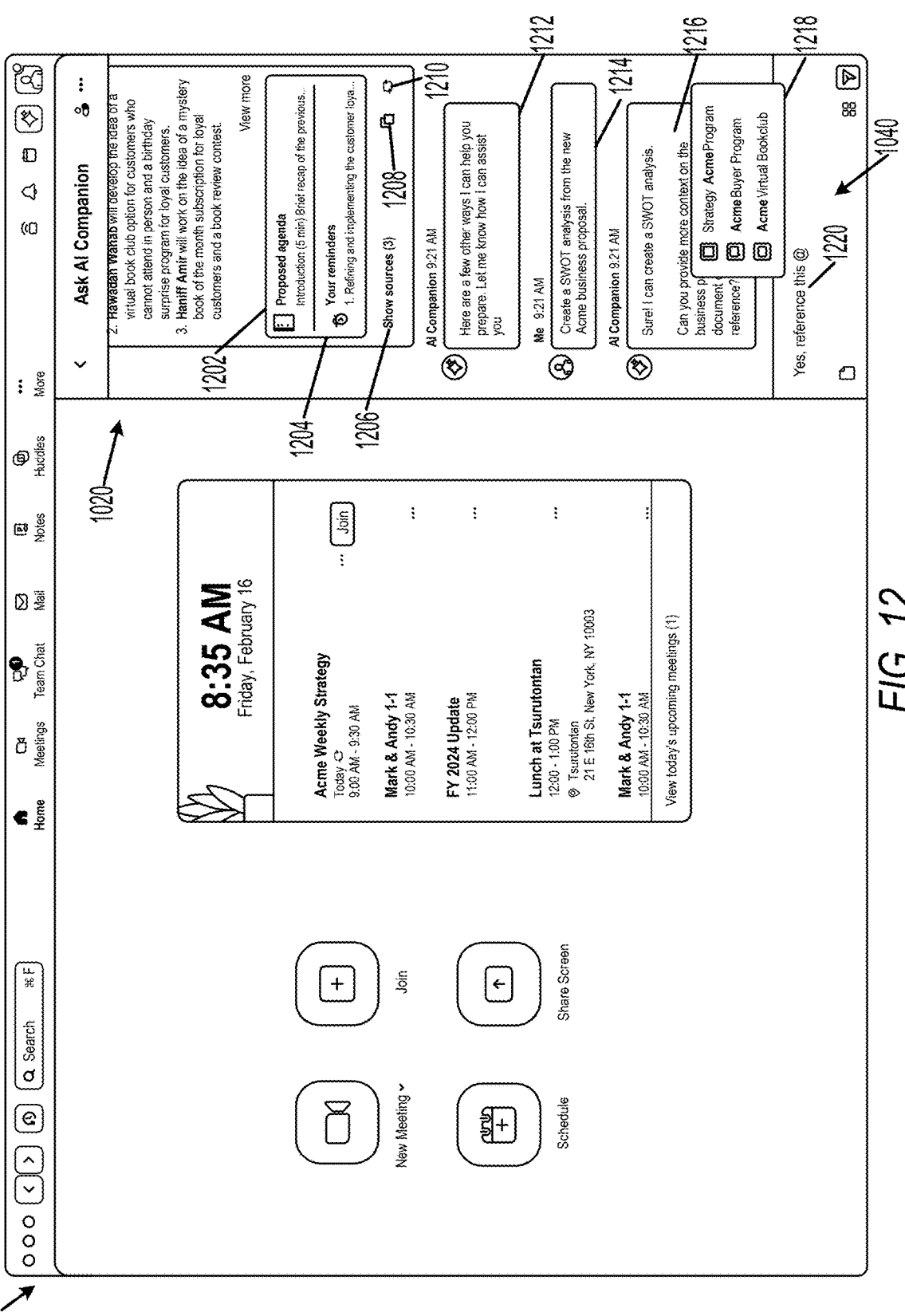
FIG. 12 shows another example of a video conferencing application UI that may be shown or interacted with on some client devices configured for chat-based querying of multiple data sources using a multi-agent infrastructure, according to some examples of the present disclosure.

FIG. 12 shows another example of a video conferencing application UI 1200 that may be shown or interacted with on some client devices configured for chat-based querying of multiple data sources using a multi-agent infrastructure, according to some examples of the present disclosure. UI 1200 shows the conversation of UI 1100 of FIG. 11 continued to illustrate some additional concepts.

In this example, the user of the client device 410 has selected the more information control 1116. The response also includes additional response documents that may be generated as part of the response. For instance, in a query relating to preparing for a meeting, the additional response documents may include a proposed agenda 1202 for the meeting or reminders 1204 (e.g., a "to-do" list) for preparing for the meeting. The response 1106 includes a sources control 1206 that can be selected to cause a list of the documents included as context information while generating the response, as described with respect to block 730 of method 700 in FIG. 7.

The response 1106 also includes a copy control 1208 that can be used to copy the text and other content of the response 1106 to the system clipboard to copy into other applications. The response 1106 also includes a regenerate control 1210 that can be used to output an indication to the query response subsystem 420 to generate a new response to the query. This may be useful in situations where the generated response is unsatisfactory, lacks desired context information, includes errors or "hallucinations," and so forth.

At 1212, the query response subsystem 420 provides a response conclusion that may prompt the user to input additional follow-on queries. In this example, the user has input a second query 1214 requesting a Strengths, Weaknesses, Opportunities, and Threats ("SWOT") analysis of a particular document. The SWOT analysis may be performed by a specialized agent, the LLM 530, or a service configured for performing SWOT analyses on documents. At 1216, the query response subsystem 420 responds with a request for additional specification of the relevant context. Such an intermediate response can be generated by the orchestrator agent 520 while determining the relevant context when more information may be useful for determining the subject of the user's query.

At 1220, the user has begun to input a reply to the response 1216 in the query input window 1040. The reply includes an "@" symbol which can cause a relevant context control 1218 to be shown. The relevant context control 1218 can enable the user to select a relevant context from a list of likely relevant contexts inferred from relevant contexts already inferred.

Figure 13:
FIG. 13 shows an example of a video conferencing UI that may be shown or interacted with on some client devices configured for chat-based querying of multiple data sources using a multi-agent infrastructure, according to some examples of the present disclosure.

FIG. 13 shows an example of a video conferencing UI 1300 that may be shown or interacted with on some client devices configured for chat-based querying of multiple data sources using a multi-agent infrastructure, according to some examples of the present disclosure. UI 1300 depicts the UI during a video conference including a chat-based interface 1350 similar to the chat-based interface 1020 shown in previous FIGS. 10-12.

UI 1300 shows an in-progress video conference as may be provided by suitable video conference client software. UI 1300 includes a main speaker window 1302. In some examples, the UI 1300 is configured to display the video conference participant 1304 that is currently speaking (e.g., "speaker view") on the main speaker window 1302, but other configurations are possible. For instance, some examples include a UI control for "pinning" a particular participant who can be shown in main speaker window 1302 regardless of who is speaking.

The UI 1300 includes a number of video conference participants 1305. In the UI 1300 configuration depicted, the participants 1305 are shown at the top of the UI 1300. Depending on the configuration, in various examples, the participants 1305 may be arrayed in a grid-like fashion, may not be shown at all, or may be displayed in some other manner. In this example, the participants 1305 are shown above the main speaker window 1302 as smaller participant windows, which allow the participant to view some of the other participants in the video conference, as well as controls ("<" and ">") to let the host scroll to view other participants in the video conference.

The UI 1300 includes a number of controls for configuring the video conference or interacting with the participants 1305. For example, the UI 1300 includes controls 1310 and 1312 allow a participant to toggle on or off audio or video streams captured by a microphone or camera connected to the client device 410. Control 1320 allows the participant to view any other participants present in the video conference along with the participant. Control 1322 allows the participant to execute an application or client software function to send text or chat messages to other participants, whether to specific participants or to the entire meeting. Control 1324 allows the participant to share content from their client device. Control 1325 allows the participant toggle recording of the meeting, and control 1328 allows the participant to select an option to join a breakout room. Control 1330 allows the participant to launch an app within the video conference client software, to, for example, access content to share with other participants in the video conference. Control 1332 can cause the chat-based interface 1350 to be displayed or hidden.

The chat-based interface 1350 shows an example conversation between a user of the client device 410 and the query response subsystem 420, also sometimes referred to as an AI companion. For example, the user of the client device 410 may have entered queries using the query input window 1040. At 1308, the user inputs a query about video conference preparation. At 1310, the query response subsystem 420 responds with information about preparations that have been made for the video conference. The query response subsystem 420 may determine the information about the preparations based on previous conversations, persisted data, filenames, file metadata, video conference transcripts, and so on, in accordance with the relevant contexts determined by the query response subsystem 420 upon receipt of the query. At 1356, the user inputs a second query about a meeting agenda, which the query response subsystem 420 may respond to similarly.

Loading symbol 1358 can indicate that the query response subsystem 420 is processing the query and generating a response. The query response subsystem 420 can be configured to operate in near-real-time, such that the experience of conversing with the query response subsystem 420 is subjectively similar to the experience of conversing with another human. Some queries may involve enough steps that the query response can take several seconds to generate. In such cases, the loading symbol 1358 may be shown.

Figure 14:
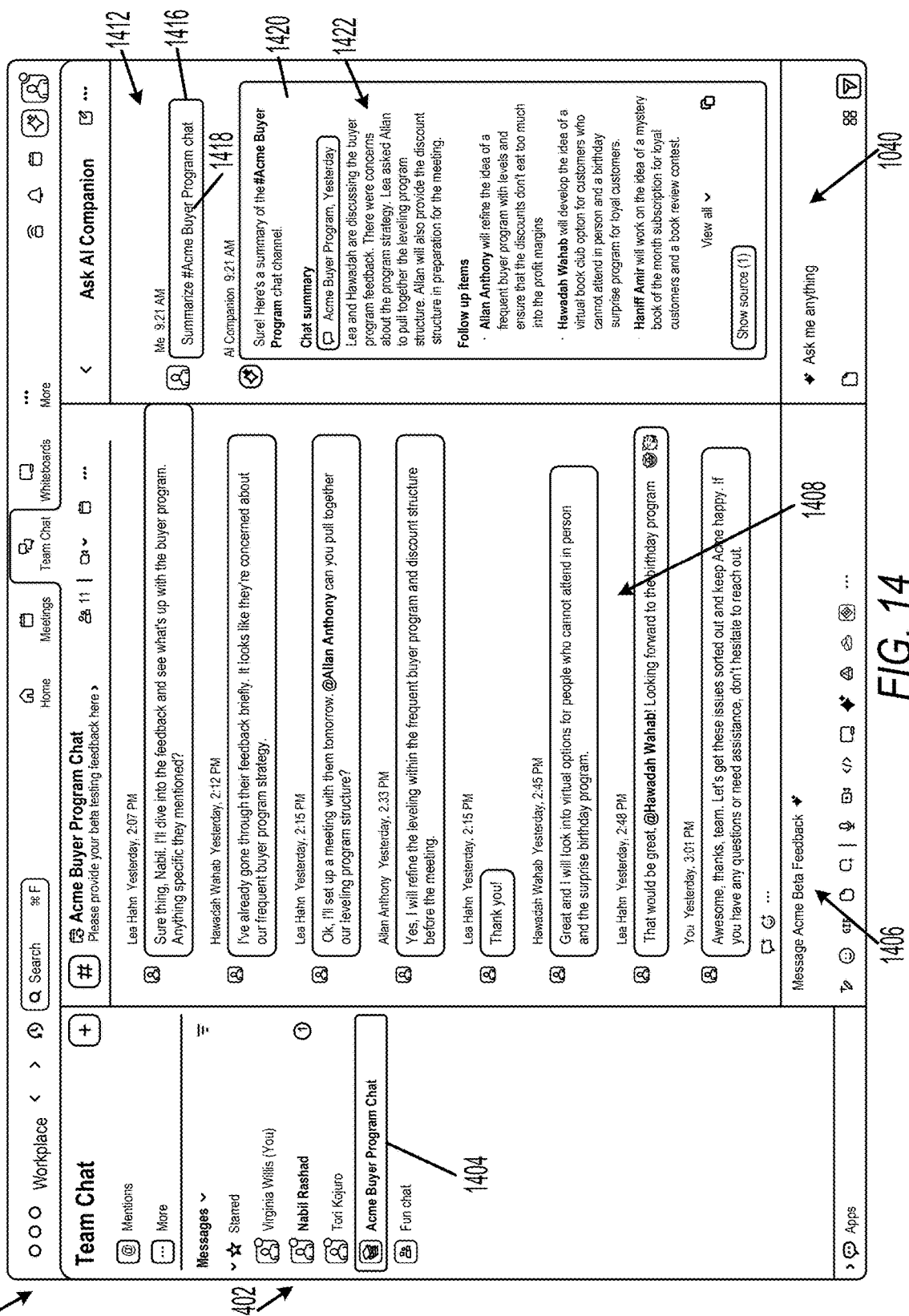
FIG. 14 shows an example of a chat application UI that may be shown or interacted with on some client devices configured for chat-based querying of multiple data sources using a multi-agent infrastructure, according to some examples of the present disclosure.

FIG. 14 shows an example of a chat application UI 1400 that may be shown or interacted with on some client devices configured for chat-based querying of multiple data sources using a multi-agent infrastructure, according to some examples of the present disclosure. UI 1400 depicts the UI of a chat application that may be provided by a video conference client software to access the corresponding service provided by the video conference provider 402. The UI 1400 includes a chat-based interface 1412 similar to the chat-based interface 1020 shown in previous FIGS. 10-12.

The example UI 1400 includes several elements of a typical chat application including chat channel listing 1402 along with a selected chat channel 1404. The chat conversation, including contributions from one or more participants, is shown in the main chat window 1408. Chat messages can be input using the suite of UI controls provided at the chat input window 1406.

The chat-based interface 1412 is shown alongside the chat application UI 1500 and shows an example of a query/ response cycle generated using chat-based querying of multiple data sources using a multi-agent infrastructure. At 1416, the user has input a query requesting a summary of a particular chat channel 1418. In this example, this chat channel 1418 is the same as the selected chat channel 1404 but could be any chat channel as well as any other suitable subject (e.g., a video conference). The query 1416 may be input using the query input window 1040.

Response 1420 generated in response to the query 1416 includes response body 1422 including elements similar to those described above with respect to FIGS. 10-12. For instance, the response body 1422 includes a summary section, follow up items, additional links, a paging control, a sources control, and a copy control. Other elements may be likewise included in response 1420 according to the configuration of the query response subsystem 420 and particular query.

Figure 15:
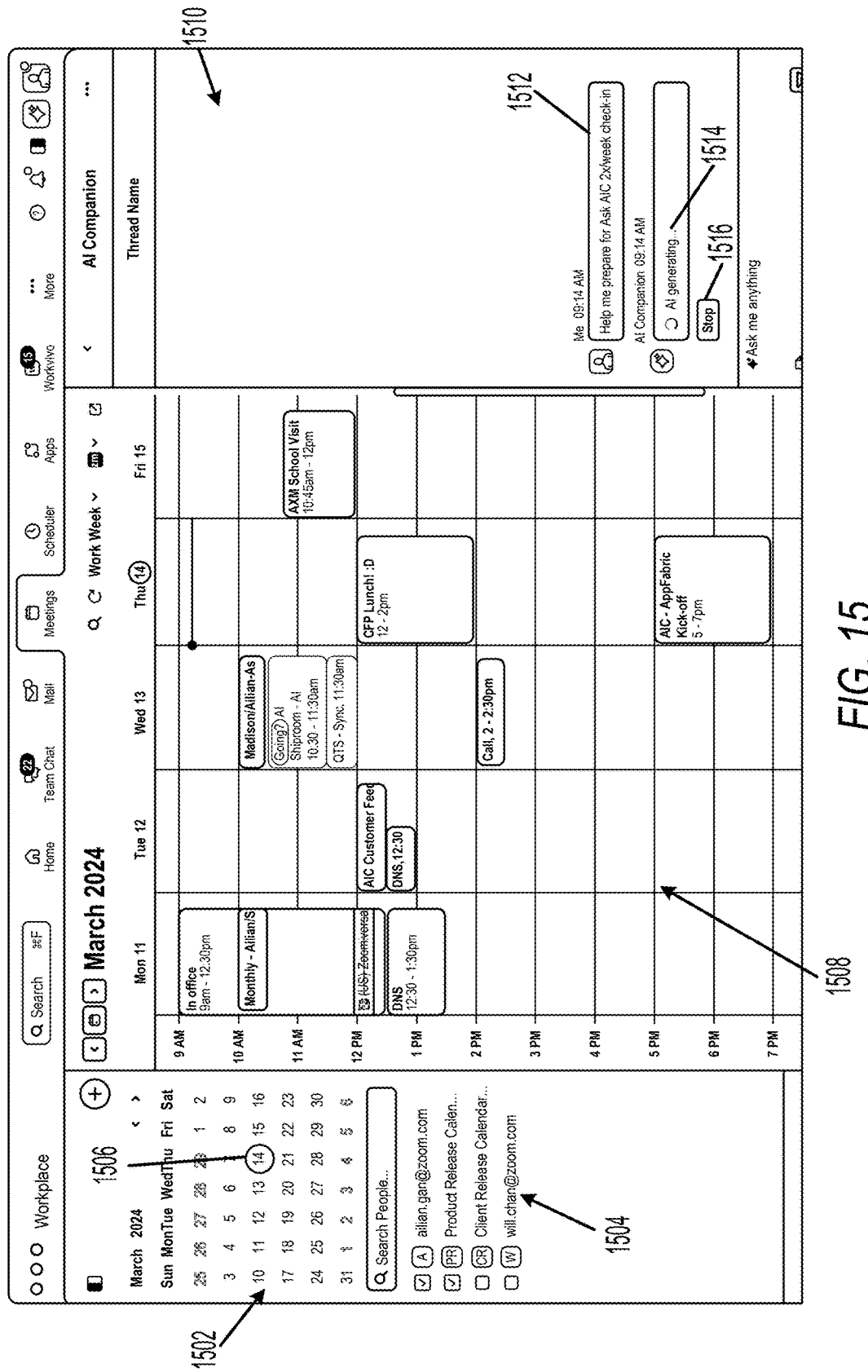
FIG. 15 shows an example of a calendar application UI that may be shown or interacted with on some client devices configured for chat-based querying of multiple data sources using a multi-agent infrastructure, according to some examples of the present disclosure.

FIG. 15 shows an example of a calendar application UI 1500 that may be shown or interacted with on some client devices configured for chat-based querying of multiple data sources using a multi-agent infrastructure, according to some examples of the present disclosure. UI 1500 depicts the UI of a calendar application that may be provided by a video conference client software to access the corresponding service provided by the video conference provider 402. The UI 1500 includes a chat-based interface 1510 similar to the chat-based interface 1020 shown in previous FIGS. 10-12.

The UI 1500 includes a calendar 1502 that can be used to select the time durations shown in the main event display 1508. For example, a day control 1506 is used to select a particular day, which can cause, according to a specified configuration, the days of the containing week to be shown in the main event display 1508. The UI 1500 also includes a participant list 1504 that may include information about participants involved with the events, tasks, appointments, reminder, etc. shown in the main event display 1508.

Chat-based interface 1510 shows a user query 1512 about an upcoming event that may be among those shown in the main event display 1508. In this example, the query 1512 requests for help preparing for the event. The query response subsystem 420 can determine information about the upcoming event to determine relevant contexts, which can then be used to obtain context information for generating the query response. As in FIG. 14, a loading symbol 1514 is shown indicating that the query response subsystem 420 is generating the response. In this example UI 1500, the chat-based interface 1510 also includes a stop button 1516 that can be selected to provide an indication to halt generation of the query response in cases in which generation is taking longer than desired. In these cases, the query response subsystem 420 may use a technique such as asynchronous messaging to notify the components of the multi-agent infrastructure to halt processing of the query 1512.

Figure 16:
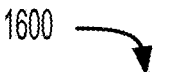
FIG. 16 shows an example of implementation of the storage system, according to some examples of the present disclosure.

Turning next to FIG. 16, FIG. 16 shows an example of implementation of the storage system 425, according to some examples of the present disclosure. The example storage system 425 includes a graph store 610 and a connector 620 component. In some examples, the storage system 425 may include other data stores 630 such as document stores, relational databases, key-value pair stores, and so on.

The graph store 610 can be used to respond to queries based on an underlying graph abstraction, similar to a graph database. The graph store 610 includes a number of components for responding to graph-based queries. In some examples, a pure graph database could be similarly used. The graph store 610 may be used to persist graph information for tenants (e.g., organization-level), individual users, globally available objects, and so on.

Information retrieved from the graph store 610 may include, for example, the context information that is added to received queries, sometime referred to as recall data. The recall data can be used to provide context for the orchestrator agent 520 responding to queries such as complete or partial meeting transcripts, emails, and other sources of recall data.

The graph store 610 includes an entity relationship database. The entity relationship database may be, for example, a relational database that persists information about and relationships between users or organizations. The entity relationship database may further include information relating users to particular events or communications, such as video conferences or chat channels.

The graph store 610 includes an entity database 640. The entity database 640 may be, for example, a document-based database that persists information or content used by the users, organizations, and services relating to the video conference provider 402. For example, the entity database 640 may be used to store video conference metadata, transcripts, summaries, chat conversations, whiteboard data, and other information.

The graph store 610 includes an entity vector index 650. The entity vector index 650 can be used for efficient queries based on vector representations (e.g., high-dimensional embedded representations) of certain entities. The vectors can be generated using ML models trained to capture, for example, semantic meaning of the names and labels of persisted entities in a high-dimensional vector space. The entity vector index 650 can be used for efficient similarity searches, clustering, or other forms of entity lookup. The entity vector index 650 can receive graph queries using a predefined syntax and join information from the entity relationship database 660 and entity database 640 to return the portion of the graph specified in the query.

The storage system 425 includes a connector component 620. The connector component 620 can import and export data from external data stores 670. The connector component 620 may include utilities 680 that can adapt or convert the information retrieved from the external data stores 670 to a suitable format for persisting in a component of the storage system 425. For example, the connector component 620 can be used to import or export data from external mail providers (e.g., Google Gmail), calendar providers (e.g., Microsoft Outlook), document or office suites (e.g., Google Documents or Microsoft Office), network storage providers (e.g., Dropbox), and so on. The utilities 680 may include utilities and tools such as PDF parsers, mail parser, or other parsers, formatters, interpreters, decompilers, etc. that can be used to adapt or convert information retrieved from the external data stores 670 to a suitable format for persisting in a component of the storage system 425.

Referring now to FIG. 17, FIG. 17 shows an example computing device 1700 suitable for use in example systems or methods for providing chat-based querying of multiple data sources using a multi-agent infrastructure, according to some examples of the present disclosure. The example computing device 1700 includes a processor 1710 which is in communication with the memory 1720 and other components of the computing device 1700 using one or more communications buses 1702. The processor 1710 is configured to execute processor-executable instructions stored in the memory 1720 to perform one or more methods for providing chat-based querying of multiple data sources using a multi-agent infrastructure according to different examples. The computing device 1700, in this example, also includes one or more user input devices 1750, such as a keyboard, mouse, touchscreen, microphone, etc., to accept user input. The computing device 1700 also includes a display 1740 to provide visual output to a user.

In addition, the computing device 1700 includes virtual conferencing software 1760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 1700 also includes a communications interface 1730. In some examples, the communications interface 1730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving, from a client device, a query; determining, using an orchestrator agent, one or more relevant contexts based on the query; receiving, from a storage system, context information based on the one or more relevant contexts; generating a modified query based on the query and the context information; outputting, to the orchestrator agent, the modified query and the context information; receiving, from the orchestrator agent, a response to the modified query; and outputting the response to the client device.

Example 2 is the method of example(s) 1, wherein the one or more relevant contexts include at least one of a video conference, a messaging transcript, an email, calendar information, or information about a user.

Example 3 is the method of example(s) 1, further comprising: determining a validity status of the response, comprising: determining a compliance status of the response; and determining a purview of the response.

Example 4 is the method of example(s) 1, wherein generating the modified query comprises: accessing a query thread, comprising previous queries and previous responses; and updating the query, based on the query thread.

Example 5 is the method of example(s) 1, wherein the orchestrator agent is configured to: determine, based on the modified query, using a large language model ("LLM"), one or more instructions to be executed by at least one of a plurality of agents and a plurality of services; for each of the one or more instructions: output the instruction to an agent of the plurality of agents or a service of the plurality of services; receive, from the agent or service, an instruction output; and generate, based on the instruction output, a portion of the response; and generate, based on the one or more portions of the response, the response.

Example 6 is the method of example(s) 5, wherein the orchestrator agent comprises an LLM.

Example 7 is the method of example(s) 1, wherein the one or more relevant contexts are determined by an LLM.

Example 8 is the method of example(s) 1, wherein: the storage system comprises one or more data sources; receiving the context information comprises: for each relevant context of the one or more relevant contexts: querying a data source of the one or more data sources; and receiving information about the relevant context; and generating the context information based on the information about the relevant contexts.

Example 9 is the method of example(s) 1, wherein the query is a predetermined query based on a task, the task being one of a preparation task, a summarization task, or a scheduling task.

Example 10 is the method of example(s) 9, wherein the predetermined query is a prompt for an LLM comprising instructions to complete the task.

Example 11 is a non-transitory computer-readable medium storing processor-executable instructions configured to cause one or more processors to: receive, from a client device, a query; determine, using an orchestrator agent, one or more relevant contexts based on the query; receive, from a storage system, context information based on the one or more relevant contexts; generate a modified query based on the query and the context information; output, to the orchestrator agent, the modified query and the context information; receive, from the orchestrator agent, a response to the modified query; and output the response to the client device.

Example 12 is the non-transitory computer-readable medium of example(s) 11, wherein the orchestrator agent comprises an LLM and is configured to: output, to the LLM, a prompt including the modified query, the prompt including first instructions to generate one or more second instructions to be executed by at least one of a plurality of agents and a plurality of services; for each of the one or more second instructions: output the second instruction to an agent of the plurality of agents or a service of the plurality of services; receive, from the agent or service, an instruction output; and generate, based on the instruction output, a portion of the response; and output, to the LLM, third instructions to generation the response using the one or more portions of the response.

Example 13 is the non-transitory computer-readable medium of example(s) 11, wherein the one or more relevant contexts are determined by an LLM.

Example 14 is the non-transitory computer-readable medium of example(s) 11, wherein: the storage system comprises one or more data sources; receiving the context information comprises: for each relevant context of the one or more relevant contexts: querying a data source of the one or more data sources; and receiving information about the relevant context; and generating the context information based on the information about the relevant contexts.

Example 15 is the non-transitory computer-readable medium of example(s) 11, wherein: the query is a predetermined query based on a task, the task being one of a preparation task, a summarization task, or a scheduling task; and the predetermined query is a prompt for an LLM comprising instructions to complete the task.

Example 16 is a system comprising: one or more non-transitory computer-readable media; and one or more processors communicatively coupled to the one or more non-transitory computer-readable media, the one or more processors configured to execute processor-executable instructions stored in the non-transitory computer-readable media to: receive, from a client device, a query; determine, using an orchestrator agent, one or more relevant contexts based on the query; receive, from a storage system, context information based on the one or more relevant contexts; generate a modified query based on the query and the context information; output, to the orchestrator agent, the modified query and the context information; receive, from the orchestrator agent, a response to the modified query; and output the response to the client device.

Example 17 is the system of example(s) 16, wherein the orchestrator agent comprises an LLM and is configured to: determine, based on the modified query, using the LLM, one or more instructions to be executed by a multi-agent infrastructure comprising a plurality of agents and a plurality of services; for each of the one or more instructions: output the instruction to an agent of the plurality of agents or a service of the plurality of services; receive, from the agent or service, an instruction output; and generate, based on the instruction output, a portion of the response; and generate, based on the one or more portions of the response, the response.

Example 18 is the system of example(s) 16, wherein: the query is input to the client device using a chat-based interface; and the one or more relevant contexts are determined by an LLM, the LLM accessed using a third-party API.

Example 19 is the system of example(s) 16, wherein: the storage system comprises a document store and a graph store; receiving the context information comprises: for each relevant context of the one or more relevant contexts: querying the document store or the graph store; and receiving information about the relevant context; and generating the context information based on the information about the relevant contexts.

Example 20 is the system of example(s) 16, wherein: the query is a predetermined query based on a task, the task being one of a preparation task, a summarization task, or a scheduling task; the predetermined query is a prompt for an LLM comprising instructions to complete the task; and outputting the query by the client device is responsive to a selection of a user interface ("UI") control including a representation of the predetermined query.

The invention claimed is:

1. A method, comprising:
receiving, from a client device, a query;
determining, using an orchestrator agent, one or more relevant contexts based on the query, wherein the orchestrator agent comprises one or more large language models ("LLMs");
receiving, from a storage system, context information based on the one or more relevant contexts;
generating a modified query based on the query and the context information;
outputting, to the orchestrator agent, the modified query and the context information, wherein:
the orchestrator agent is configured to determine, based on the modified query, using the one or more LLMs, one or more instructions to be executed by at least one of a plurality of agents and a plurality of services; and
the orchestration agent is further configured to access information about the storage system and capabilities of the plurality of agents and the plurality of services;
receiving, from the orchestrator agent, a response to the modified query; and
outputting the response to the client device.

2. The method of claim 1, wherein the one or more relevant contexts include at least one of a video conference, a messaging transcript, an email, calendar information, or information about a user.

3. The method of claim 1, further comprising:
determining a validity status of the response, comprising:
determining a compliance status of the response; and
determining a purview of the response.

4. The method of claim 1, wherein generating the modified query comprises:
accessing a query thread, comprising previous queries and previous responses; and
updating the query, based on the query thread.

5. The method of claim 1, wherein the orchestrator agent is further configured to:
for each instruction of the one or more instructions:
output the instruction to an agent of the plurality of agents or a service of the plurality of services;
receive, from the agent or service, an instruction output; and
generate, based on the instruction output, a portion of the response; and generate, based on the one or more portions of the response, the response.

6. The method of claim 1, wherein the one or more relevant contexts are determined by an LLM.

7. The method of claim 1, wherein:

the storage system comprises one or more data sources;

receiving the context information comprises:

for each relevant context of the one or more relevant contexts:

querying a data source of the one or more data sources; and receiving information about the relevant context; and generating the context information based on the information about the relevant contexts.

8. The method of claim 1, wherein the query is a predetermined query based on a task, the task being one of a preparation task, a summarization task, or a scheduling task.

9. The method of claim 8, wherein the predetermined query is a prompt for an LLM comprising instructions to complete the task.

10. A non-transitory computer-readable medium storing processor-executable instructions configured to cause one or more processors to:

receive, from a client device, a query;

determine, using an orchestrator agent, one or more relevant contexts based on the query, wherein the orchestrator agent comprises one or more LLMs;

receive, from a storage system, context information based on the one or more relevant contexts;

generate a modified query based on the query and the context information;

output, to the orchestrator agent, the modified query and the context information, wherein:

the orchestrator agent is configured to output, to the one or more LLMs, prompts including the modified query, the prompts including first instructions to generate one or more second instructions to be executed by at least one of a plurality of agents and a plurality of services; and the orchestration agent is further configured to access information about the storage system and capabilities of the plurality of agents and the plurality of services;

receive, from the orchestrator agent, a response to the modified query; and output the response to the client device.

11. The non-transitory computer-readable medium of claim 10, wherein the orchestrator agent is further configured to:

for each second instruction of the one or more second instructions:

output the second instruction to an agent of the plurality of agents or a service of the plurality of services;

receive, from the agent or service, an instruction output; and generate, based on the instruction output, a portion of the response; and output, to the one or more LLMs LLM, third instructions to generation the response using the one or more portions of the response.

12. The non-transitory computer-readable medium of claim 10, wherein the one or more relevant contexts are determined by an LLM.

13. The non-transitory computer-readable medium of claim 10, wherein:

the storage system comprises one or more data sources;

receiving the context information comprises:

for each relevant context of the one or more relevant contexts:

querying a data source of the one or more data sources; and receiving information about the relevant context; and generating the context information based on the information about the relevant contexts.

14. The non-transitory computer-readable medium of claim 10, wherein:

the query is a predetermined query based on a task, the task being one of a preparation task, a summarization task, or a scheduling task; and the predetermined query is a prompt for an LLM comprising instructions to complete the task.

15. A system comprising:

one or more non-transitory computer-readable media; and one or more processors communicatively coupled to the one or more non-transitory computer-readable media, the one or more processors configured to execute processor-executable instructions stored in the non-transitory computer-readable media to:

receive, from a client device, a query;

determine, using an orchestrator agent, one or more relevant contexts based on the query, wherein the orchestrator agent comprises one or more LLMs;

receive, from a storage system, context information based on the one or more relevant contexts;

generate a modified query based on the query and the context information;

output, to the orchestrator agent, the modified query and the context information, wherein:

the orchestrator agent is configured to determine, based on the modified query, using the one or more LLMs, one or more instructions to be executed by a multi-agent infrastructure comprising a plurality of agents and a plurality of services; and the orchestration agent is further configured to access information about the storage system and capabilities of the plurality of agents and the plurality of services;

receive, from the orchestrator agent, a response to the modified query; and output the response to the client device.

16. The system of claim 15, wherein the orchestrator agent is further configured to:

for each instruction of the one or more instructions:

output the instruction to an agent of the plurality of agents or a service of the plurality of services;

receive, from the agent or service, an instruction output; and generate, based on the instruction output, a portion of the response; and generate, based on the one or more portions of the response, the response.

17. The system of claim 15, wherein:

the query is input to the client device using a chat-based interface; and the one or more relevant contexts are determined by an LLM, the LLM accessed using a third-party API.

18. The system of claim 15, wherein:

the storage system comprises a document store and a graph store;

receiving the context information comprises:

for each relevant context of the one or more relevant contexts:

querying the document store or the graph store; and receiving information about the relevant context; and
generating the context information based on the information about the relevant contexts.

19. The system of claim 15, wherein:

the query is a predetermined query based on a task, the task being one of a preparation task, a summarization task, or a scheduling task;

the predetermined query is a prompt for an LLM comprising instructions to complete the task; and outputting the query by the client device is responsive to a selection of a user interface ("UI") control including a representation of the predetermined query.

20. The method of claim 1, wherein:

the query is input to the client device using a chat-based interface for an artificial intelligence ("AI") companion application executing during a video conference comprising a plurality of client devices including the client device.

\* \* \* \* \*